(12) United States Patent
Fink et al.

(10) Patent No.: US 12,136,007 B2
(45) Date of Patent: Nov. 5, 2024

(54) RADIO-FREQUENCY IDENTIFICATION (RFID) ANTENNA ASSEMBLY AND MULTIPLEXER MODULE

(71) Applicant: United States of America as represented by the Administrator of NASA, Houston, TX (US)

(72) Inventors: Patrick W. Fink, Houston, TX (US); Greg Y. Lin, Houston, TX (US); Phong H. Ngo, Houston, TX (US); David S. Hafermalz, Houston, TX (US); Raymond S. Wagner, Houston, TX (US); Lazaro D. Rodriguez, Houston, TX (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 8 days.

(21) Appl. No.: 17/810,890

(22) Filed: Jul. 6, 2022

(65) Prior Publication Data
US 2024/0013019 A1    Jan. 11, 2024

(51) Int. Cl.
*G06K 19/07* (2006.01)
*G06K 19/073* (2006.01)
*H01Q 1/22* (2006.01)

(52) U.S. Cl.
CPC ..... *G06K 19/0724* (2013.01); *G06K 19/0701* (2013.01); *G06K 19/07345* (2013.01); *H01Q 1/2208* (2013.01)

(58) Field of Classification Search
CPC ............... H01Q 1/2225; H01Q 1/2216; H01Q 1/2208; H01Q 1/50; G06K 19/0722;
(Continued)

(56) References Cited

U.S. PATENT DOCUMENTS

| 6,563,417 B1 | 5/2003 | Shaw |
| 7,197,279 B2 | 3/2007 | Bellantoni |

(Continued)

FOREIGN PATENT DOCUMENTS

| EP | 2547116 A2 * | 1/2013 | ........... H04N 21/235 |
| JP | 2009157332 A * | 7/2009 | ............. G06Q 30/02 |
| WO | WO2020150424 A1 | 7/2020 | |

OTHER PUBLICATIONS

Wada et al., "A 10 Gb/s Optical Code Division Multiplexing Using 8-Chip Optical Bipolar Code and Coherent Detection" (Year: 1999).*

(Continued)

*Primary Examiner* — Thien T Mai
(74) *Attorney, Agent, or Firm* — Kurt G. Hammerle; Edward K. Fein

(57) ABSTRACT

A radio-frequency identification (RFID) antenna assembly, per an implementation, includes a number of multiplexer modules coupled with one another. Radio frequency (RF) signals are received from an RFID reader. One or more of the multiplexer modules has a switch with multiple output ports. An antenna connects with one of the output ports and, per an implementation, an encoder connects with another of the output ports. The multiplexer module(s) may also have a first rectifier for rapid self-powering capabilities, and a second rectifier for more robust self-powering capabilities.

12 Claims, 10 Drawing Sheets

(58) Field of Classification Search
CPC ........... G06K 19/0701; G06K 19/0724; G06K 19/07345; G06K 19/077; G06K 19/07745
See application file for complete search history.

(56) References Cited

U.S. PATENT DOCUMENTS

| | | |
|---|---|---|
| 7,432,874 B2 | 10/2008 | Meissner |
| 7,614,556 B2 | 11/2009 | Overhultz et al. |
| 7,642,917 B2 | 1/2010 | Tran |
| 8,446,256 B2 | 5/2013 | Pinkham |
| 8,736,423 B2 | 5/2014 | Campero et al. |
| 8,941,471 B2 | 1/2015 | Shafer |
| 8,981,907 B1 | 3/2015 | Lavache |
| 9,361,493 B2 | 6/2016 | Kikin |
| 9,424,447 B2 | 8/2016 | Puleston et al. |
| 9,575,156 B2 | 2/2017 | Mkrtchyan et al. |
| 9,690,959 B2 | 6/2017 | Chin et al. |
| 9,954,586 B1 | 4/2018 | Hiari et al. |
| 10,038,479 B2 | 7/2018 | Seo et al. |
| 10,644,762 B2 | 5/2020 | Seol et al. |
| 2009/0009296 A1 | 1/2009 | Shafer |
| 2009/0027202 A1 | 1/2009 | Copeland et al. |
| 2009/0284354 A1* | 11/2009 | Pinkham ............ G06K 7/10356 340/10.3 |
| 2014/0049379 A1 | 2/2014 | Pinkham |
| 2015/0200868 A1 | 7/2015 | Swildens et al. |
| 2016/0034729 A1 | 2/2016 | Sehmer et al. |
| 2019/0253123 A1 | 8/2019 | Su et al. |

OTHER PUBLICATIONS

Borisenko, "Intercepting UHF RFID signals through synchronous detection" (Year: 2013).*

Kashif Ali and Hossam Hassanein, Distributed Receiving in RFID Systems, 2009 IEEE 34th Conference on Local Computer Networks (LCN 2009), Oct. 20-23, 2009, pp. 69-76, Zurich, Switzerland.

Ajeck M. Ndifon, Michael J. Crisp, Richard V. Penty, Ian H. White, Enhanced RFID Tag Detection Accuracy Using Distributed Antenna Arrays, 2018 IEEE International Conference on RFID (RFID), 6 pages, Cambridge, United Kingdom.

Michael Crisp, Rui Chen, Adjeck Ndifon, Richard Penty, Antennas for Wide Area Distributed RFID Systems, 2020 International Workshop on Antenna Technology (iWAT), 3 pages, Cambridge, UK.

* cited by examiner

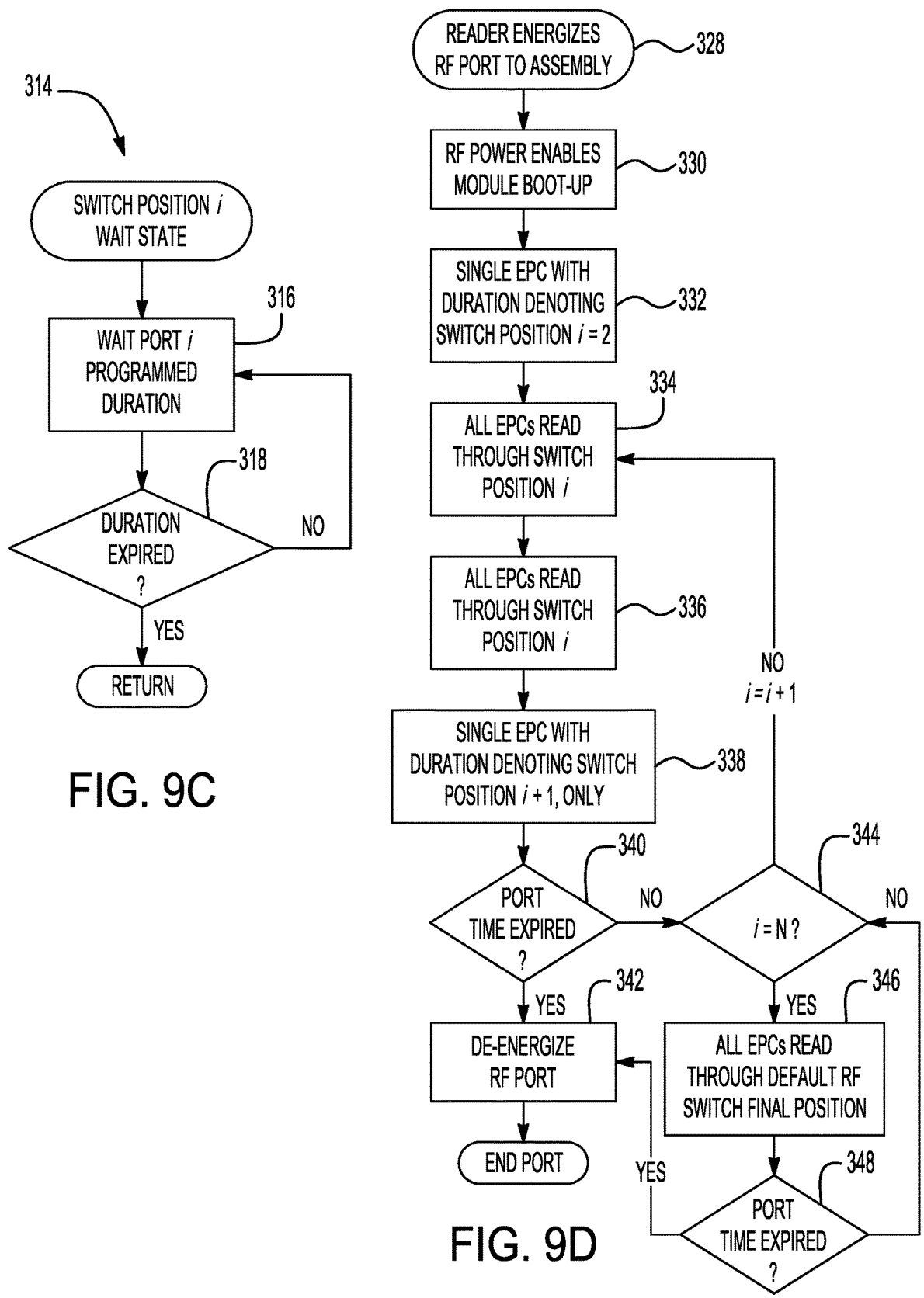

US 12,136,007 B2

RADIO-FREQUENCY IDENTIFICATION (RFID) ANTENNA ASSEMBLY AND MULTIPLEXER MODULE

STATEMENT OF GOVERNMENT INTEREST

The embodiments described herein may be manufactured and used by or for the Government of the United States of America for governmental purposes without payment of any royalties thereon or therefor.

TECHNICAL FIELD

The present disclosure relates generally to radio-frequency identification (RFID) technologies and, more particularly, to antenna assemblies employed in RFID systems and to multiplexing radio frequency (RF) signals in RFID systems.

BACKGROUND

Radio-frequency identification systems employ RFID readers (also known as RFID interrogators) to detect the presence of RFID tags carried by objects and, in some cases, to identify the location of the tagged objects. Antennas are typically connected to the RFID readers and radiate signals amid a population of RFID tags. Use of RFID systems is widespread. The systems can be used in a warehouse, factory, and retail setting to keep track of inventory, as well as in medical, automotive, aviation, agricultural, restaurant, wine cellar, and parking applications, among many other possibilities.

In order to increase the number of antennas available from RFID readers, multiplexers can be equipped in RFID systems. A multiplexer is connected to an RFID reader and has multiple antennas stemming from it. The multiplexer selectively connects the antennas to the RFID reader for radiating signals through one or more of the antennas.

SUMMARY

In an embodiment, a radio-frequency identification (RFID) antenna assembly may include multiple multiplexer modules coupled with one another. One or more of the multiplexer modules may include a switch and an encoder. The switch receives radio frequency (RF) signals from an RFID reader by way of an input port. The switch has multiple output ports. A state of the switch can be changed to each of the output ports. A first output port of the switch is capable of connecting with an antenna. A second output port of the switch is capable of connecting with the encoder.

In an embodiment, a radio-frequency identification (RFID) antenna multiplexer module may include a switch, a microcontroller, a first rectifier, and a second rectifier. The switch receives radio frequency (RF) signals from an RFID reader. The switch has multiple output ports. One or more of the output ports is capable of connecting with an antenna. The microcontroller commands a change of state of the switch among the output ports. The first rectifier receives a portion or more of the RF signals from the RFID reader. Power from the first rectifier is used to set the switch to a default state among the output ports at the time after initial activation of the RFID antenna multiplexer module and before initiation of a query from the RFID reader. The second rectifier receives a portion or more of the RF signals from the RFID reader. Power from the second rectifier is received by the microcontroller. The microcontroller commands the change of state of the switch among the output ports after the switch is set to the default state.

In an embodiment, a method of controlling a radio-frequency identification (RFID) antenna multiplexer module may include a number of steps. One step may involve receiving radio frequency (RF) signals from an RFID reader. Another step may involve powering the RFID antenna multiplexer module by way of a portion or more of the received RF signals. Yet another step may involve changing a state of a switch to an output port that is in connection with an encoder. This change of state occurs prior to or subsequent to a change of state of the switch among one or more other output ports. And another step may involve communicating backward to the RFID reader when the switch is in connection with the encoder.

BRIEF DESCRIPTION OF THE DRAWINGS

One or more aspects of the disclosure will hereinafter be described in conjunction with the appended drawings, wherein like designations denote like elements, and wherein:

FIG. 9C is a flowchart of an embodiment of a switch position wait state;

FIG. 9D is a flowchart of an embodiment of a workflow process of the RFID reader;

DETAILED DESCRIPTION

Referring generally to the drawings, at least some embodiments of a radio-frequency identification (RFID)

antenna assembly 10 furnish a greater distribution of radio frequency (RF) signals from an RFID reader 12 amid identification of RFID tags and to a greater area. A denser assemblage of smaller-sized antennas may be facilitated with use of the RFID antenna assembly 10, effecting dissemination of RF signals to more regions including extended regions, fixed regions, open regions, and closed regions (e.g., drawers, enclosures). Enhanced granularity of RFID tag localization may result. Further, augmented distribution and coverage may, more generally, provide better logistics awareness in the larger RFID system equipped with the RFID antenna assembly 10, and may provide more effective and efficient overall RFID sensing capabilities. Moreover, the additional infrastructure oftentimes accompanying past efforts of increasing RF signals and area coverage—i.e., supplemental RFID readers, power and control cable additions, added and/or modified reader software—may be unnecessary in certain embodiments of the RFID antenna assembly 10. The consequential growth in complexity, size, mass, and cost of the additional infrastructure may hence be avoided. Still, a particular embodiment of the RFID antenna assembly 10 may exhibit only one or a combination of the advancements set forth herein, none of the advancements, or even other advancements.

The RFID antenna assembly 10 is employable in many applications including warehouse settings, factory settings, and retail settings, as well as in medical, automotive, aviation, agricultural, restaurant, wine cellar, and parking applications, among others. The RFID antenna assembly 10 may also find ready use and installation in space vehicle and spacecraft applications.

Figure 1:
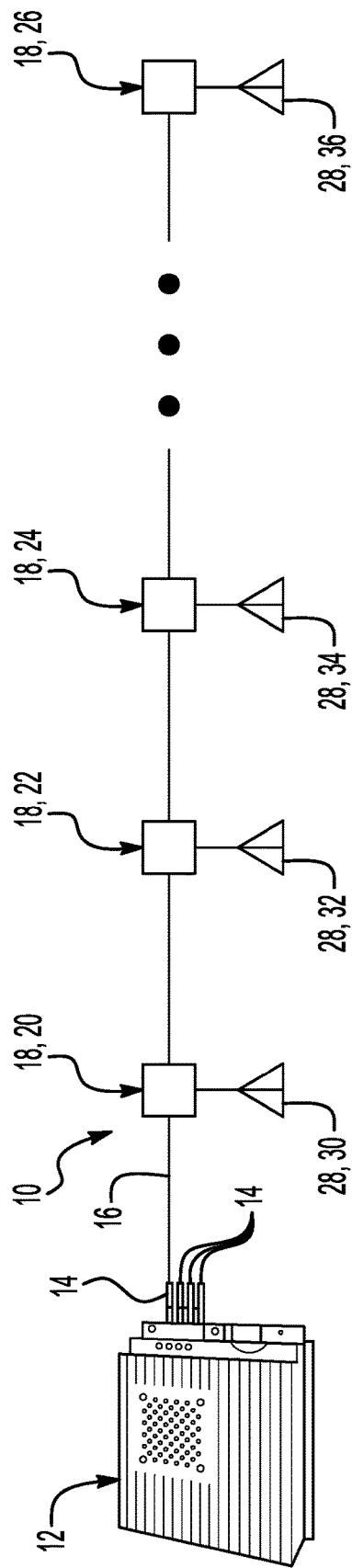
FIG. 1 is a schematic representation of an embodiment of a radio-frequency identification (RFID) antenna assembly, the figure also showing an RFID reader.
Figure 2:
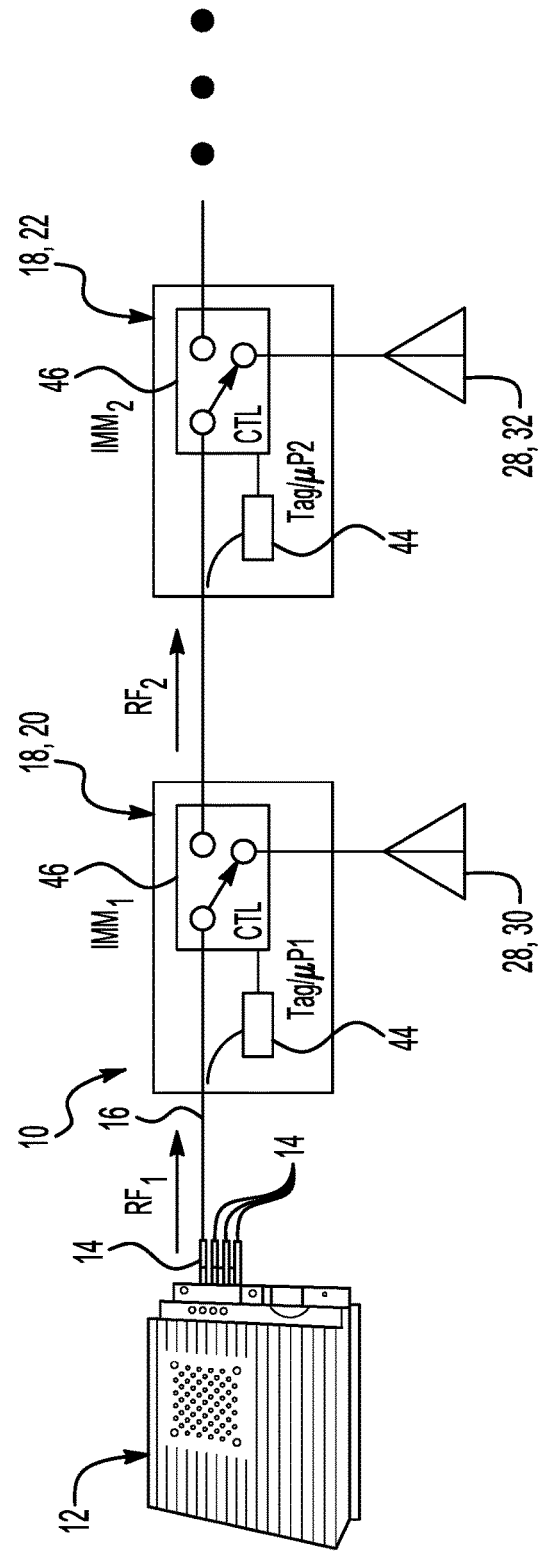
FIG. 2 is a schematic representation of an embodiment of the RFID antenna assembly, the figure also showing the RFID reader.

With reference to FIGS. 1 and 2, the RFID reader 12 provides RF signaling to the RFID antenna assembly 10 in order to detect the presence of RFID tags that are often carried by objects for tracking purposes and, in some implementations, to identify the location of the RFID tags and the accompanying objects. The RFID reader 12 can issue a query command to initiate the detection procedure, as an example. The RFID reader 12 can receive signals from the RFID antenna assembly 10 in response. The received signals can be processed by a data consumer to inventory tagged assets or determine the location of any detected RFID tags, for example, among other possible processing that can occur and possible determinations that can be made. The data consumer can be software embedded in the RFID reader 12 or of another component having upstream or downstream communication with the RFID reader 12. In general, the RFID reader 12 can be a fixed device, a portable device, or a handheld device. Ports 14 of the RFID reader 12 provide hardwired connections from the RFID reader 12 and to downstream antennas or other components. The connections are commonly made by coaxial cabling. The RFID tags subject to interrogation, detection, and location can be of the passive type of tag or the active type of tag. Depending on the type, the RFID tags can be composed of a substrate, an integrated circuit, an antenna, a battery, or a combination thereof, among other components. Response information from the RFID tags when interrogated can include an identifier and/or the identity of the object tagged and its location, as examples. Communications between the RFID tags subject to interrogation and the RFID antenna assembly 10 are wireless communications.

The RFID antenna assembly 10 is connected to the RFID reader 12 via one of the reader's ports 14 and receives RF signals from the RFID reader 12. A single cable connection 16 spans between the RFID antenna assembly 10 and RFID reader 12 for signal transmission. In at least some embodiments, the single cable connection 16 can constitute the sole cable connection between the RFID antenna assembly 10 and RFID reader 12, and can provide the sole power and control source of the RFID antenna assembly 10. In other words, additional cabling, such as power and control cables often added in past RFID systems, may not be provided in at least some embodiments of the RFID antenna assembly 10. The cable connection 16 can be a coaxial cable connection. In general, the RFID antenna assembly 10 can have various designs, constructions, and components in different embodiments depending upon—among other possible factors—the desired distribution of RF signals and the intended area of RF signal coverage for RFID tag interrogation.

In the embodiment of FIGS. 1 and 2, the RFID antenna assembly 10 includes multiple RFID antenna multiplexer modules 18, or just "multiplexer modules," coupled to one another in a series arrangement and spanning from the cable connection 16. The series arrangement provides a chain of multiplexer modules, and each multiplexer module in the chain can constitute a multiplexer stage of the RFID antenna assembly 10. At places along the chain of multiplexer modules, intermediate components and nodes of varying types may be provided in some embodiments. An initial and first multiplexer module 20 (denoted $IMM_1$ in FIG. 2 for intelligent multiplexer module) of the series is directly connected to the RFID reader 12 via the cable connection 16 and receives RF signals (denoted $RF_1$ in FIG. 2) from the RFID reader 12. A second multiplexer module 22 (denoted $IMM_2$ in FIG. 2) is coupled to the first multiplexer module 20 downstream thereof, and receives resultant RF signals (denoted $RF_2$ in FIG. 2) from the first multiplexer module 20 via a conjoining RF transmission line. A third multiplexer module 24 is coupled to the second multiplexer module 22 downstream thereof, and receives resultant RF signals from the second multiplexer module 22 via a conjoining RF transmission line. And likewise, a terminal and fourth multiplexer module 26 is coupled downstream of the third multiplexer module 24. Additional intermediate multiplexer modules may reside between the third multiplexer module 24 and the fourth multiplexer module 26 (the ellipsis in FIG. 1 denotes this possibility), as well as intermediate components and nodes.

It has been observed that RF signal loss experienced between successive multiplexer modules and stages can be minimal in some embodiments of the RFID antenna assembly 10, and can even be nominal, demonstrating the suitability of a multitude of multiplexer modules in series arrangement in the RFID antenna assembly 10. In an embodiment similar to that of FIG. 2, for example, the multiplexer module $IMM_1$ can consume minimal power, and hence the resultant RF signal $RF_2$ can be largely equivalent to the RF signal $RF_1$ or only slightly less. Further, test data has shown that four multiplexer stages with four multiplexer modules similar to those depicted in FIG. 2 experienced a total RF signal loss of less than approximately 4 decibels (dB) over the four stages and modules. The precise quantity of individual multiplexer modules coupled in series arrangement that make-up the RFID antenna assembly 10 according to such an embodiment can vary, and may be dictated by the residual RF signal remaining after successive multiplexer stages and modules. In one embodiment, there is a total of four or more individual multiplexer modules; in another embodiment, there is a total of eight or more individual multiplexer modules; yet in another embodiment, there is a total of twelve or more individual multiplexer modules. Still, other quantities are possible in other embodiments.

Figure 3:
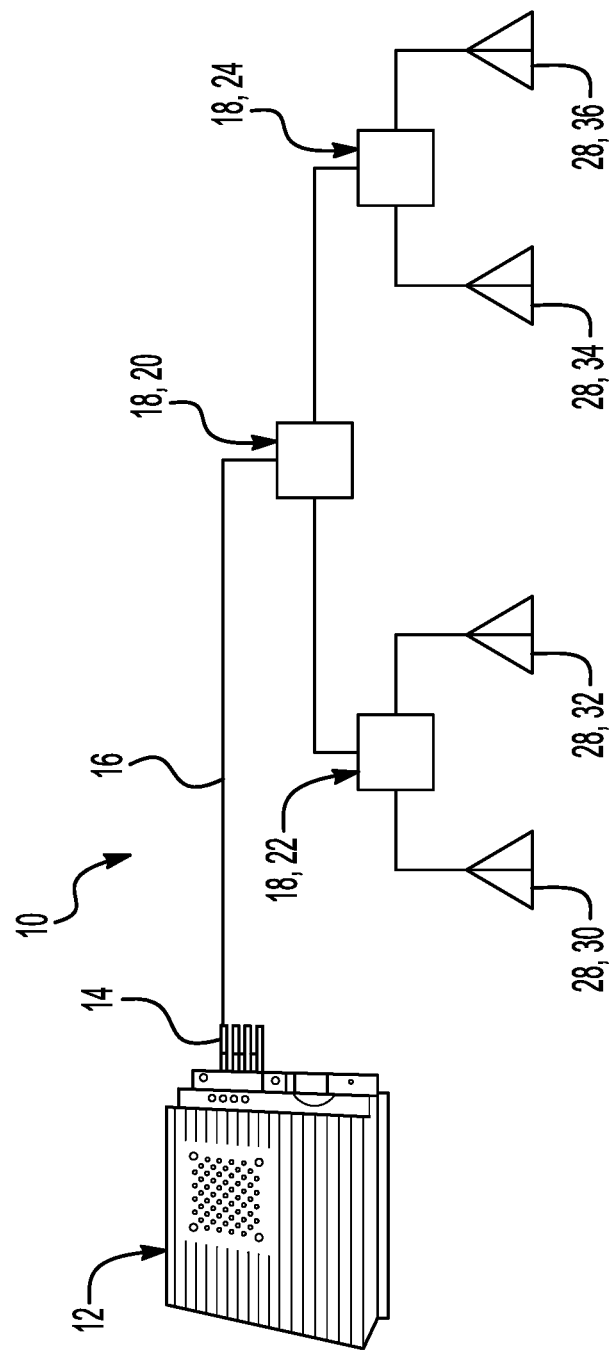
FIG. 3 is a schematic representation of an embodiment of the RFID antenna assembly, the figure also showing the RFID reader.

FIG. 3 presents another embodiment of the RFID antenna assembly 10 in which multiple multiplexer modules 18 are coupled together in a cascading arrangement. Again here, the multiplexer modules 18 span from the cable connection 16, and each multiplexer module can constitute a multiplexer stage of the RFID antenna assembly 10. At places within the cascading arrangement and among the multiplexer modules 18, intermediate components and nodes of varying types may be provided in some embodiments. The initial and first multiplexer module 20 of this arrangement is directly connected to the RFID reader 12 via the cable connection 16 and receives RF signals from the RFID reader 12. The second multiplexer module 22 is coupled to the first multiplexer module 20 downstream thereof, and receives resultant RF signals from the first multiplexer module 20 via a conjoining RF transmission line. In a similar way, the third multiplexer module 24 is coupled to the first multiplexer module 20 downstream thereof, and receives resultant RF signals from the first multiplexer module 20 via another conjoining RF transmission line. The resultant RF signals to the second and third multiplexer modules 22, 24 can be largely equivalent in magnitude. Still, additional multiplexer modules may reside downstream of the second multiplexer module 22 and/or downstream of the third multiplexer module 24. The precise quantity of individual multiplexer modules coupled in cascading arrangement that make-up the RFID antenna assembly 10 according to such an embodiment can vary, and may be dictated by the residual RF signal remaining after consecutive multiplexer stages and modules. The cascading arrangement embodiment of FIG. 3 may minimize RF signal loss and may balance RF signal loss among the multiplexer stages of the RFID antenna assembly 10—for example, the RF signal loss exhibited at the second and third multiplexer modules 22, 24 may be equivalent, as opposed to one RF signal loss being greater than the other.

Antennas 28 span from the multiplexer modules 18 and radiate wireless signals in the form of electromagnetic waves amid use of the RFID antenna assembly 10. The antennas 28 establish interrogation zones for interrogating any RFID tags occupied therein, and can receive response RF signals from RFID tags. An individual antenna 28 can establish an individual interrogation zone. Each multiplexer module 18 can have connections to one or more antennas 28, or can lack an antenna. In the embodiments of FIGS. 1 and 2, each multiplexer module 18 has a single antenna 28. A first antenna 30 stems from the first multiplexer module 20, a second antenna 32 stems from the second multiplexer module 22, a third antenna 34 stems from the third multiplexer module 24, and a fourth antenna 36 stems from the fourth multiplexer module 26. In the embodiment of FIG. 3, on the other hand, the first multiplexer module 20 lacks an antenna, the first and second antennas 30, 32 stem from the second multiplexer module 22, and the third and fourth antennas 34, 36 stem from the third multiplexer module 24. Here, since the first multiplexer module 20 lacks an antenna while the second and third multiplexer modules 22, 24 have antennas, the architecture and components and subcomponents of the first multiplexer module 20 may differ from those of the second and third multiplexer modules 22, 24. The antennas 28 can be of any type suitable for use in RFID antenna systems. Examples include, but are not limited to, dipole antennas, helix antennas, and patch antennas. Further, the antennas 28 can exhibit linear polarization, multi-linear and diverse polarization, elliptical polarization, circular polarization, or another kind of polarization, and can be a short-range antenna or a long-range antenna in terms of its area of intended coverage for RFID tag interrogation. The antennas 28 in a particular RFID antenna assembly 10 need not be the same relative to one another, and rather the antennas 28 could differ with respect to one another in regards to type, performance, or some other aspect.

Figure 4:
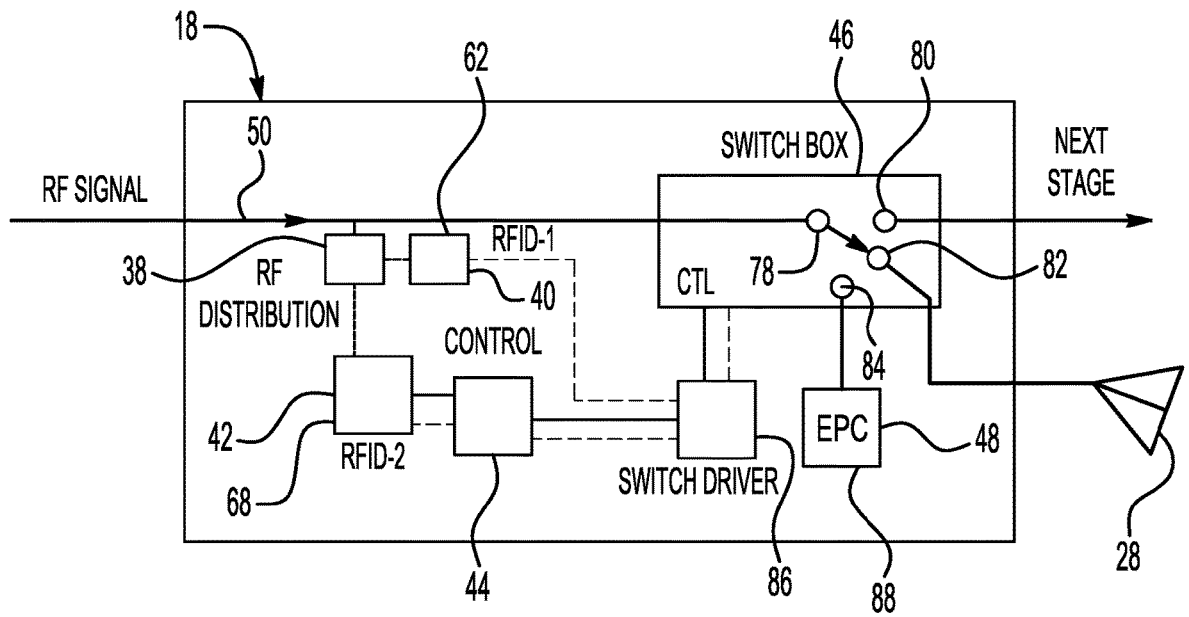
FIG. 4 is a schematic layout of an embodiment of an RFID antenna multiplexer module.
Figure 5:
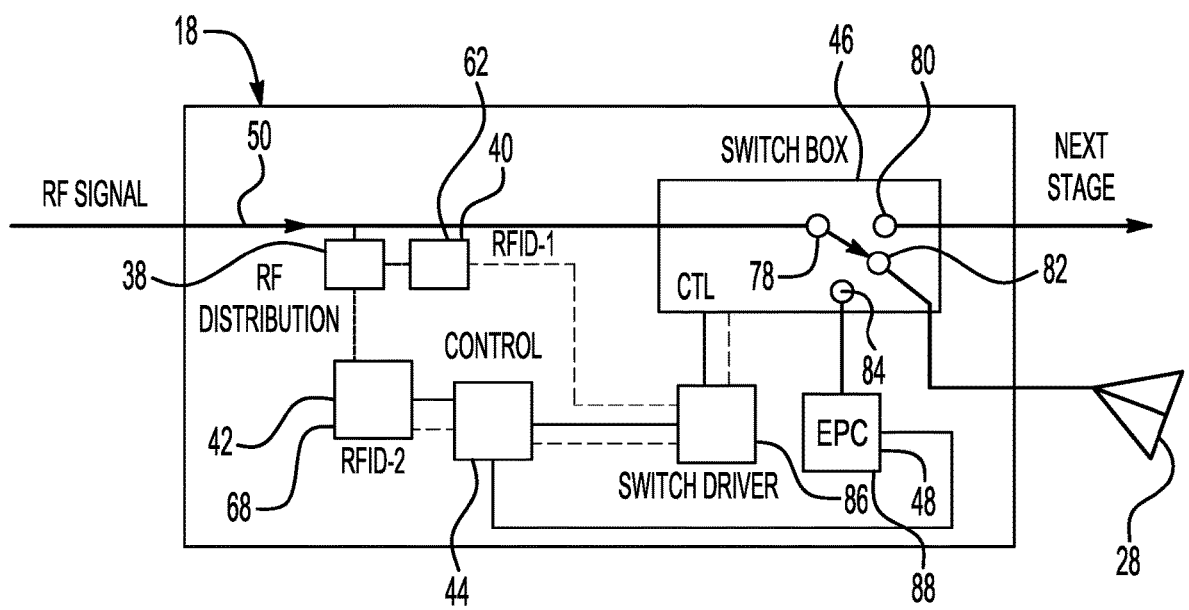
FIG. 5 is a schematic layout of an embodiment of the RFID antenna multiplexer module.

An individual multiplexer module 18 can have various architectures, components, and subcomponents in different embodiments depending upon—among other possible influences—the desired performance and functionalities of the multiplexer module 18. Also, discrete multiplexer modules 18 in a particular RFID antenna assembly 10 and chain or other arrangement of multiplexer modules need not be identical relative to one another, and rather could differ with respect to one another in various ways. FIGS. 4 and 5 depict an embodiment of the multiplexer module 18 by presenting functional and symbolic relationships and representations among certain components thereof. In this embodiment, the multiplexer module 18 includes an RF distribution component 38, a first power component 40, a second power component 42, a microcontroller 44, a switch 46, and an encoder 48. Components of the multiplexer module 18 can be carried on a PCB substrate. Still, the multiplexer module 18 could have more or less or different components in other embodiments. For instance, in an embodiment the multiplexer module 18 could have a single power component and/or could lack the microcontroller 44. And in another embodiment the multiplexer module 18 could lack the encoder 48.

The RF distribution component 38 distributes RF signals for local consumption of power by the multiplexer module 18 and by components residing downstream of the RF distribution component 38. Incoming RF signals are received via an RF transmission line 50. The incoming RF signals can be transmitted from the RFID reader 12, from a discrete upstream multiplexer module, or from an upstream component or node. A small portion or fraction of RF signals and RF power is coupled from the RF transmission line 50 via the RF distribution component 38 and to the first power component 40, and is hence received by the first power component 40. In a similar manner, a small portion or fraction of RF signals and RF power is coupled from the RF transmission line 50 via the RF distribution component 38 and to the second power component 42, and is hence received by the second power component 42. The respective amounts of RF signals and RF power to the first and second power components 40, 42 may be the same or may differ, depending on the need or demand of the first and second power components 40, 42. A much greater portion, or vast majority, of incoming RF signals and RF power is not received by the first power component 40 or by the second power component 42 and instead continues to the switch 46 for reception by the switch 46. The RF power may also constitute modulated RF signals from the RFID reader 12 to RFID chips (subsequently introduced) residing in the multiplexer module 18, as well as return RF signals from the RFID chips of the multiplexer module 18 back to the RFID reader 12. The RF distribution component 38 can take various forms in different embodiments. In one embodiment, the RF distribution component 38 can be one or two or more RF directional couplers or power dividers. For example, a first RF directional coupler can be provided to couple RF signals and RF power to the first power component 40, and a second RF directional coupler can be provided to couple RF signals and RF power to the second power component 42. The first and second RF directional couplers in this example can have a series arrangement relative to each other. In another embodiment, the RF distribution component 38 is a single RF directional coupler that couples RF signals and RF power to both of the first and second power components 40, 42, to additional components, or to other components; here, an RF power splitter or power divider, T-junction, or other technique can be employed for RF distribution purposes. Furthermore, the coupling of RF signals and RF power may be effected in different ways, per various embodiments. The RF distribution component 38 may couple RF signals and RF power via connected sections of conductive wires, transmission lines, or waveguides, as some examples. Other examples include coupling of RF signals and RF power electromagnetically and without direct conductively-connected wires or transmission lines. Indeed, at least when used with reference among components of the multiplexer module 18, the terms "connection" and "electrical connection" and grammatical variations thereof are intended to have an expansive meaning to refer to connections that facilitate the flow of RF signals and may include, but are not limited to, conductive connections and electromagnetic connections, among other possibilities.

The first power component 40 provides power to one or more components of the multiplexer module 18, and serves to provide rapid charging for a power supply that quickly stabilizes the switch 46. Power generation of the first power component 40 contributes to enabling RF power harvesting and self-powering capabilities of at least some embodiments of the multiplexer module 18 and, in turn, of at least some embodiments of the larger RFID antenna assembly 10. A portion or more of RF signals received by the first power component 40 are converted to direct current (DC) power. With continued reference to FIGS. 4 and 5, in this embodiment RF signals are received from the RF distribution component 38. After conversion at the first power component 40 to DC power, DC power is transmitted to a switch driver component (subsequently introduced) per an embodiment. The first power component 40 can take various forms in different embodiments. In one embodiment, the first power component 40 is a first rectifier. The first rectifier 40 can be incorporated and integrated with a first RFID chip 62 (labeled RFID-1 in FIGS. 4 and 5). The first rectifier 40 may be embedded in, and may provide power to, the first RFID chip 62. The first RFID chip 62 can have a built-in rectifier, per an embodiment. The first RFID chip 62 and the RFID reader 12 can communicate with each other. For example, the first RFID chip 62 may facilitate backward communication in the form of RF backscattering with the RFID reader 12. Further, unlike wireless communications involving the RFID tags subject to interrogation, communications to/from the first RFID chip 62 are wired communications. A first RFID transceiver can be incorporated with the first RFID chip 62. Further, the first power component 40 can include power regulating circuits in order to manage DC power transmitted to other components such as to the switch driver component. One or more capacitors can be employed as part of the first power component 40 to serve a charge-storing function. Here, compared to the second power component 42, the capacitor(s) of the first power component 40 can have a decreased size for faster rectification and faster charging at the first power component 40.

The second power component 42 provides power to one or more components of the multiplexer module 18, and serves to provide power management at times of use of increased power load demands on the multiplexer module 18. The second power components 42 can constitute a more robust power supply compared to that of the first power component 40. Power generation of the second power component 42, as well as that of the first power component 40, contributes to enabling RF power harvesting and self-powering capabilities of at least some embodiments of the multiplexer module 18 and of at least some embodiments of the larger RFID antenna assembly 10. The first power component 40, the second power component 42, or portions thereof or the whole of both can constitute power generation and power management circuitry of the multiplexer module 18. A portion or more of RF signals received by the second power component 42 are converted to direct current (DC) power. With continued reference to FIGS. 4 and 5, in this embodiment RF signals are received from the RF distribution component 38. After conversion at the second power component 42 to DC power, DC power is transmitted to the microcontroller 44. The second power component 42 can take various forms in different embodiments. In one embodiment, the second power component 42 is a second rectifier. The second rectifier 42 can be incorporated and integrated with a second RFID chip 68 (labeled RFID-2 in FIGS. 4 and 5). The second rectifier 42 may be embedded in, and may provide power to, the second RFID chip 68. The second RFID chip 68 can have a built-in rectifier, per an embodiment. Communication between the RFID reader 12 and microcontroller 44 can occur via the second RFID chip 68. The second RFID chip 68 may facilitate heightened communication between the RFID reader 12 and microcontroller 44 than may otherwise be possible in its absence. For example, the second RFID chip 68 may facilitate backward communication in the form of RF backscattering with the RFID reader 12. Further, unlike wireless communications involving the RFID tags subject to interrogation, communications to/from the second RFID chip 68 are wired communications. A second RFID transceiver can be incorporated with the second RFID chip 68. Further, the second power component 42 can include power regulating circuits in order to manage DC power transmitted to other components such as to the microcontroller 44. One or more capacitors can be employed as part of the second power component 42 to serve a charge-storing function. Here, compared to the first power component 40, the capacitor(s) of the second power component 42 can have an increased size with slower rectification and slower charging at the second power component 42. The second power component 42 and its capacitor(s) can hence possess greater charge storage capacity.

The microcontroller 44 manages control of one or more components of the multiplexer module 18 amid its use and amid use of the RFID antenna assembly 10. For example, the microcontroller 44 can command a change of state of the switch 46. Among further functions potentially performed in different embodiments, the microcontroller 44 can manage the open and close timing between switch states of the switch 46, the sequence of initiation of switch states, and the duration in which the switch 46 is maintained in a particular switch state and at one of its output ports (introduced below). Parameters of functions carried out by the microcontroller 44, such as state duration, can be preprogrammed in the microcontroller 44 or commanded by the RFID reader 12. In an embodiment, the microcontroller 44 has embedded software, and can include a microprocessor, a read-only memory (ROM), a random-access memory (RAM), and general-purpose input/output (I/O) interfaces, or a combination thereof; still, the microcontroller 44 could have more, less, and/or different components, depending on the functionalities it is intended to carry out.

Command and control of the switch 46 can be administered by the microcontroller 44, by the RFID reader 12 (not specifically shown in FIGS. 4 and 5), or by both the microcontroller 44 and RFID reader 12. In one embodiment, the microcontroller 44 commands and controls the switch 46 wholly independent of the RFID reader 12 and in the absence of administration by the RFID reader 12. Here, parameters of control—such as open and close timing and duration of switch states—can be preprogrammed in the microcontroller 44. In another embodiment, the RFID reader 12 commands and controls the switch 46 wholly independent of the microcontroller 44 and in the absence of administration by the microcontroller 44 (again, not specifically shown in FIGS. 4 and 5). Parameters of control, such as open and close timing and duration of switch states, can be commanded by the RFID reader 12. In yet another embodiment, the microcontroller 44 and RFID reader 12 cooperate to command-and-control certain aspects of the switch 46. For example, the RFID reader 12 can command the open and close timing of the switch 46 among its states, and can command the duration of a particular switch state. The RFID reader 12 can transmit control signals to the microcontroller 44 via the RF distribution component 38. Control parameters of the microcontroller 44 can be modified by control signals transmitted from the RFID reader 12. For instance, the RFID reader 12 can make modifications to the microcontroller's embedded software by control signals transmitted to the microcontroller 44. The modified microcontroller embedded software can be in persistent memory such that the programming is retained when the multiplexer module 18 is deactivated and powered off and subsequently activates and reboots. Therefore, once reprogrammed, the microcontroller 44 can execute a sequence of switch states and durations, for instance, without programming at each boot-up.

The switch 46 directs received RF signals to one of its output ports amid use of the multiplexer module 18. RF signals can be received from the RFID reader 12, from a discrete upstream multiplexer module, or from an upstream component or node. With reference to the embodiment of FIGS. 4 and 5 (the switch 46 is labeled SWITCH BOX), a majority of the incoming RF signals transmitted via the RF transmission line 50 is received at the switch 46. The switch 46 can have different quantities of input and output ports. In the embodiment of FIGS. 4 and 5, the switch 46 has a single input port 78 and three output ports: a first output port 80, a second output port 82, and a third output port 84. Still, in another embodiment the switch 46 could have four or six or more output ports. The input port 78 constitutes the sole input port of the switch 46, and constitutes a common input port for the three output ports 80, 82, 84. RF signals are received by the input port 78. A change of state of the switch 46 serves to direct RF signals to one of its output ports. Amid use, the switch 46 moves its position for alignment with a particular output port. In a first switch state, RF signals travel from the input port 78 and to the first output port 80. In a second switch state, RF signals travel from the input port 78 and to the second output port 82 (this is the state depicted in FIGS. 4 and 5). And in a third switch state, RF signals travel from the input port 78 and to the third output port 84.

The output ports of the switch 46 can be routed to various downstream components. The first output port 80 is connectable downstream of the multiplexer module 18, and could electrically connect to a discrete downstream multiplexer module or a downstream component or node (the notation NEXT STAGE in FIGS. 4 and 5 denotes this possibility). RF signals advance downstream of the multiplexer module 18 in the first switch state. The second output port 82 is electrically connected with the antenna 28. RF signals advance to the antenna 28 in the second switch state. The third output port 84 is RF coupled to the encoder 48. RF signals advance to the encoder 48 in the third switch state, and the encoder 48 can be read in the third switch state. In an embodiment, while in the third switch state, the encoder 48 is the sole encoder communication source received by the RFID reader 12. In other embodiments, while in the third switch state, in addition to encoder communication from the encoder 48, the RFID reader 12 can receive RFID communications from the first and second RFID chips 62, 68 of the particular multiplexer module 18 and from RFID chips of discrete upstream multiplexer modules.

In the embodiments of FIGS. 4 and 5, a switch driver 86 may be provided and may reside in-between the microcontroller 44 and the switch 46. Command and control of the switch 46 may be via the switch driver 86. In other embodiments the switch driver 86 could be absent. When present, the switch driver 86 can be made-up of a number of switch driver devices.

The encoder 48 (labeled EPC in FIGS. 4 and 5) is employed in order to preclude disassociation between one or more RFID tags that are read amid interrogation and the particular antenna 28 that received the corresponding signal(s) from the RFID tag(s). Ambiguities that could otherwise arise when establishing correspondence and matching between an RFID tag that is read and the antenna 28 through which a signal was received are hence prevented. The encoder 48 conveys feedback to the data consumer, and in some embodiments to the RFID reader 12, when the switch 46 connects with the encoder 48. In an embodiment, the feedback is in the form of a unique identifier, or an identification code (e.g., EPC code)—the term "identifier" and grammatical variations thereof are intended to have an expansive meaning to refer to identifiers, codes, and/or values, as well as other identification indicia that can be conveyed from an encoder. In one example, the unique identifier can be used to identify a particular switch 46 and a particular antenna 28 of the RFID antenna assembly 10. In another example, the unique identifier can serve as an indication of a change of state of the switch 46. The indication informs the data consumer that the switch 46 will subsequently move its position to another output port. Per an embodiment, the unique identifier of a particular encoder 48 in the RFID antenna assembly 10 can exhibit a multitude of values as set by the microcontroller 44. Furthermore, in an embodiment, the encoder 48 has a stored value. The stored value can serve as an indication of a particular state of the switch 46, such as a previous state of the switch 46 or of a forthcoming state of the switch 46. In an example, the stored value can be modified by the microcontroller 44 in order to index a particular state of the switch 46. In an embodiment, a third RFID chip 88 is incorporated and integrated with the encoder 48, and can hence serve as the encoder. The third RFID chip 88 is connectable with the switch 46 via the third output port 84. The third RFID chip 88 can communicate with the RFID reader 12. For example, the third RFID chip 88 may facilitate backward communication in the form of RF backscattering with the RFID reader 12. Further, unlike wireless communications involving the RFID tags subject to interrogation, communications to/from the third RFID chip 88 are wired communications.

Figure 6:
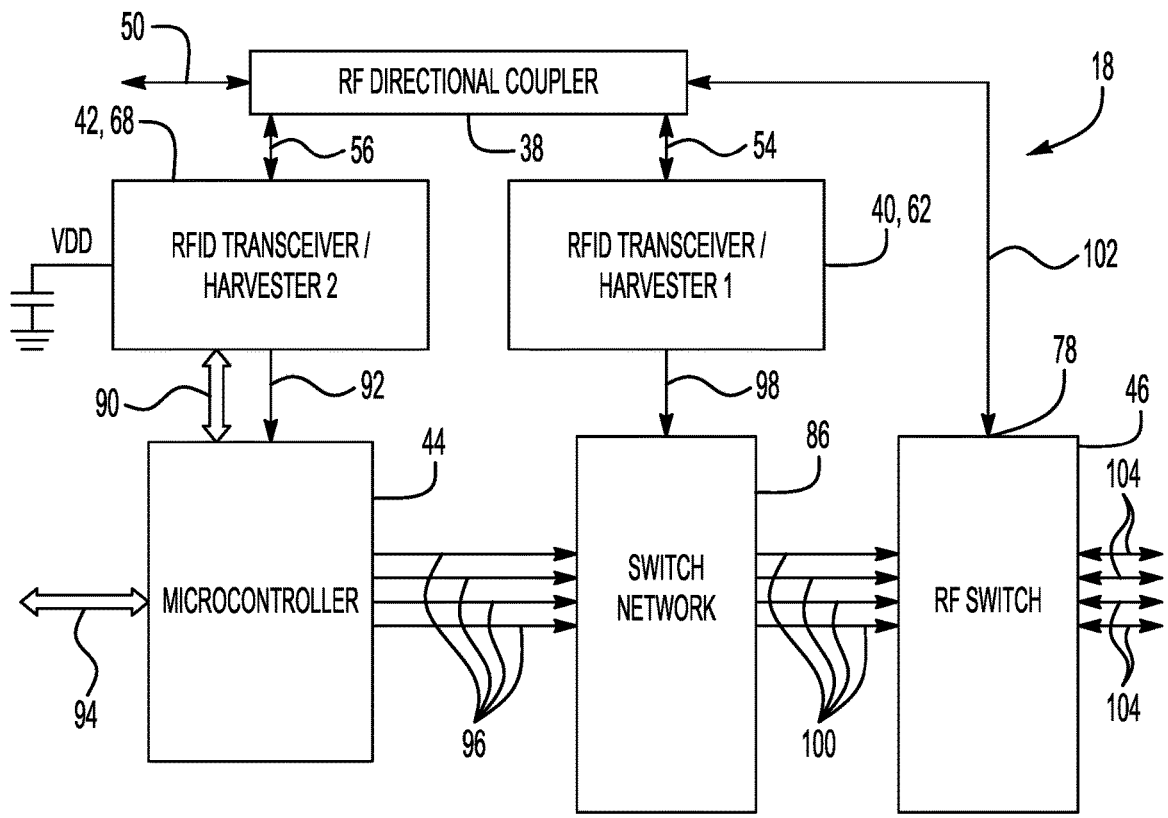
FIG. 6 is a schematic block diagram of an embodiment of the RFID antenna multiplexer module.
Figure 7:
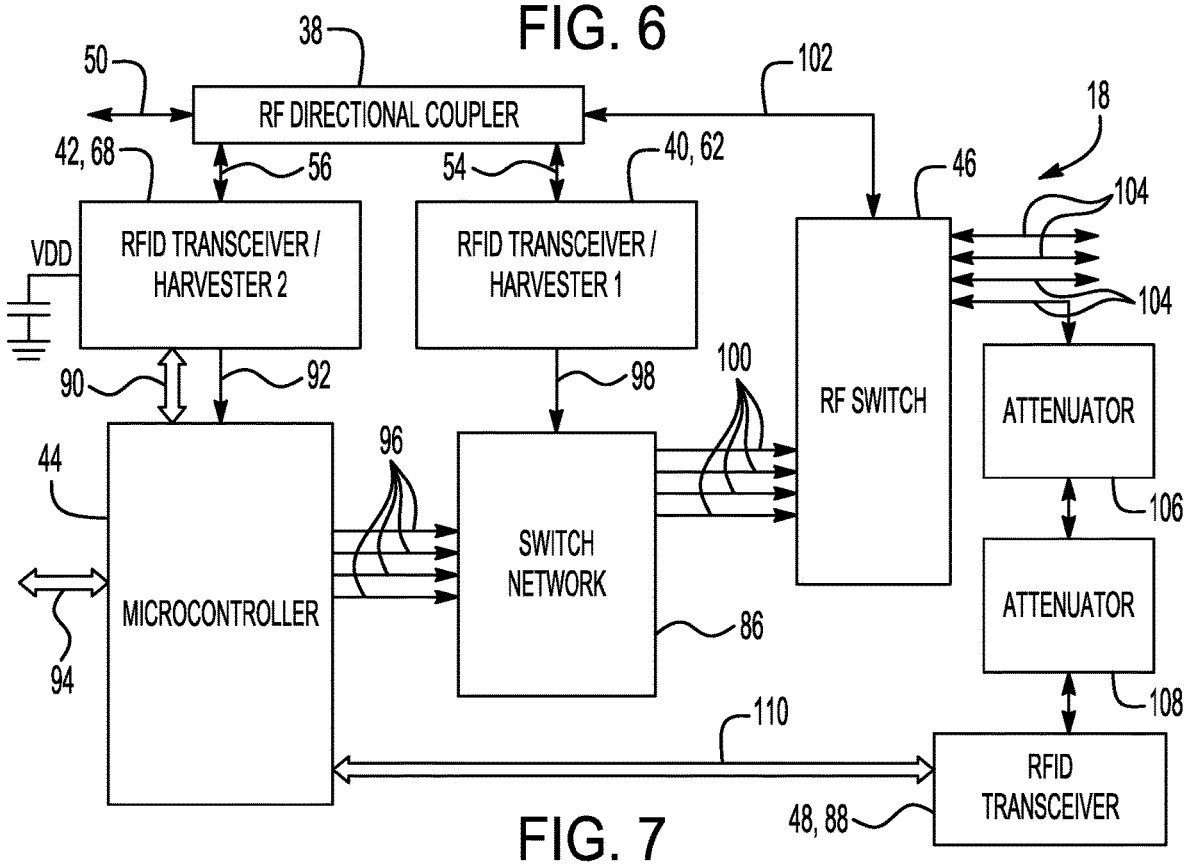
FIG. 7 is a schematic block diagram of an embodiment of the RFID antenna multiplexer module.

FIGS. 6 and 7 present an embodiment of an implementation of the multiplexer module 18 in block diagram form. In these examples, incoming and outgoing RF signals are transmitted via the RF transmission line 50 from/to the RFID reader 12, from/to a discrete upstream/downstream multiplexer module, or from/to a discrete upstream/downstream component or node. Maximum nominal power input can be approximately 30 decibel-milliwatts (dBm) in an example, and the maximum power received in another embodiment can be approximately 33.0 dBm in an example; still, other magnitudes are possible in other examples. In the embodiment of FIGS. 6 and 7, the RF distribution component 38 includes a first RF directional coupler 54 and a second RF directional coupler 56. The first RF directional coupler 54 electrically connects the RF distribution component 38 and first power component 40 to each other; and the second RF directional coupler 56 electrically connects the RF distribution component 38 and second power component 42 to each other. A supply voltage VDD is produced by the second rectifier 42 and second RFID chip 68 (labeled RFID TRANSCEIVER/HARVESTER 2 in FIGS. 6 and 7). The supply voltage VDD can exhibit a stored voltage of 3.0 V. In one embodiment, the supply voltage VDD can be a capacitor supplied under the product number 06036D226MAT2A by AVX Corporation of Fountain Inn, South Carolina USA; still, other capacitor products from other companies are possible. In this embodiment, the first RFID chip 62 (labeled RFID TRANSCEIVER/HARVESTER 1 in FIGS. 6 and 7) can be an RFID chip supplied under the product name Rocky100 by FARSENS, S. L. of San Sebastian, Spain. Likewise, the second RFID chip 68 can be an RFID chip supplied under the product name Rocky100 by FARSENS, S. L. of San Sebastian, Spain. Still, other RFID chip products from other companies are possible.

Further, in the embodiment of FIGS. 6 and 7, a serial peripheral interface (SPI) 90 electrically and communicably couples the second rectifier/RFID chip 42, 68 and microcontroller 44 to each other, and a first regulated power supply voltage rail 92 resides therebetween. The SPI interface 90 can constitute control transmission lines between the components. In other embodiments, the SPI interface 90 could be replaced by an I²C interface, as an example. The first regulated power supply voltage rail 92 can constitute a DC power transmission line. A microprocessor programming interface 94 electrically couples with the microcontroller 44 in order to facilitate initial programming of the accompanying microprocessor. In this embodiment, the microcontroller 44 can be a mixed-signal microcontroller supplied under the product number MSP430FR2433 by Texas Instruments Incorporated of Dallas, Texas USA; still, other microcontroller products from other companies are possible. General purpose input/output (I/O) lines 96 electrically couple the microcontroller 44 and the switch driver 86 (labeled SWITCH NETWORK) to each other. Control signals are transmitted from the microcontroller 44 and to the switch driver 86 via the lines 96. One or more of the lines 96 can constitute a DC power transmission line. The quantity of the lines 96 that connect the microcontroller 44 and switch driver 86 to each other can vary and can be more or less than those illustrated in FIGS. 6 and 7. Also, a second regulated power supply voltage rail 98 electrically couples the first rectifier/RFID chip 40, 62 and switch driver 86 to each other according to these examples, and command lines 100 electrically couple the switch driver 86 and switch 46 to each other. The second regulated power supply voltage rail 98 can constitute a DC power transmission line. The second regulated power supply voltage rail 98 can additionally, or alternatively, serve as a signal to one or more inputs of the switch driver 86 to set the input(s) to a logic setting of "high," whereas the input(s) may otherwise default to a logic setting of "low." Control signals are transmitted from the switch driver 86 and to the switch 46 via the lines 100. The control signals from the switch driver 86 can serve to set the state of the switch 46 and change its state. In this embodiment, the switch driver 86 can be a CMOS device containing a single-pole, double throw (SPDT) switch supplied under the product number ADG839YKSZ by Analog Devices, Inc. of Norwood, Massachusetts USA; still, other switch driver products from other companies are possible. RF signals can be exchanged between the RF directional coupler 38 and switch 46 (labeled RF SWITCH) via an RF transmission line 102. In this embodiment, the switch 46 can be a GaAs FET I/C single-pole, four-throw (SP4T) switch supplied under the model number SKY13322-375LF SP4T by Skyworks Solutions, Inc. of Irvine, California USA; still, other switch products from other companies are possible. From the switch 46, RF signals can be exchanged from/to the switch 46 and to/from a discrete downstream/upstream multiplexer module, to/from an antenna 28, to/from a discrete downstream/upstream component or node, or a combination thereof. The exchange of RF signals is via output ports 104 of the switch 46. The output ports 104 are analogous to the first, second, and third output ports 80, 82, 84 of FIGS. 4 and 5.

With particular reference to FIG. 7, in this embodiment a first attenuator 106 electrically couples with one of the output ports 104, and a second attenuator 108 electrically couples with the first attenuator 106. The second attenuator 108 can reside downstream of the first attenuator 106. The first attenuator 106 can be a 3 dB surface mount attenuator in an example, and the second attenuator 108 can be a 20 dB surface mount attenuator in an example; still, other types of attenuators of other specifications can be provided. In one embodiment, the first attenuator 106 can be a fixed attenuator supplied under the product number RCAT-03+ by Mini-Circuits of Brooklyn, New York USA, and the second attenuator 108 can be supplied by Mini-Circuits under the product number RCAT-20+; still, other attenuator products from other companies are possible. Further, the second attenuator 108 is electrically coupled to the encoder 48/third RFID chip 88 (labeled RFID TRANSCEIVER). In this embodiment, the third RFID chip 88 can be an RFID chip supplied under the product number IPJ-P6005-X2AT or IPJ-P6005-X2BT by Impinj, Inc. of Seattle, Washington USA; still, other RFID chip products from other companies are possible. Lastly, in the embodiment of FIG. 7, an inter-integrated circuit (I²C) interface 110 electrically couples the encoder 48/third RFID chip 88 and microcontroller 44 to each other. The I²C interface 110 can constitute control transmission lines between the components. Control signals can be transmitted from the microcontroller 44 and to the encoder 48/third RFID chip 88 via the lines 110. Still, in other embodiments, the interface represented at 110 could be an IC interface of another type such as an SPI interface.

The RFID antenna assembly 10 can function in different modes of use. The RFID reader 12 and microcontroller 44 can execute varying degrees of command and control of the RFID antenna assembly 10 and of individual multiplexer modules 18 in different embodiments. Command and control can be administered wholly by the RFID reader 12 (not specifically depicted in FIGS. 4-7), wholly by the microcontroller 44, or can be shared in part by the RFID reader 12 and in part by the microcontroller 44.

In a first mode of use, per an embodiment and with reference now to FIGS. 1 and 2, the RFID reader 12 commands state changes of the switches 46 in individual multiplexer modules 18 of the RFID antenna assembly 10 via the cable connection 16 and via the RF transmission line 50 (FIGS. 4-7). Power is initiated at the RFID reader 12, and the microcontroller 44 of the first multiplexer module 20 powers and boots-up. The RFID reader 12 instructs the switch 46 of the first multiplexer module 20 to change its state to the output port in connection with the first antenna 30 (e.g., in FIGS. 4 and 5, the second switch state and the second output port 82). The switch 46 remains in connection with the first antenna 30 for a first time period $T_1$. After the first time period $T_1$ expires, the RFID reader 12 instructs the switch 46 of the first multiplexer module 20 to close and change its state to the output port in connection with the second multiplexer module 22 (e.g., in FIGS. 4 and 5, the first switch state and the first output port 80). The microcontroller 44 of the second multiplexer module 22, in turn, powers and boots-up. As before, the RFID reader 12 instructs the switch 46 of the second multiplexer module 22 to change its state to the output port in connection with the second antenna 32 (e.g., in FIGS. 4 and 5, the second switch state and the second output port 82). The switch 46 remains in connection with the second antenna 32 for a second time period $T_2$. The second time period $T_2$ and first time period $T_1$ can have the same value. Once again, after the second time period $T_2$ expires, the RFID reader 12 instructs the switch 46 of the second multiplexer module 22 to close and change its state to the output port in connection with the third multiplexer module 24. All the while, the switch 46 of the first multiplexer module 20 has remained in the output port in connection with the second multiplexer module 22 in order to advance RF signals, and the switch 46 of the second multiplexer module 22 does the same to advance RF signals. The procedure described for the first multiplexer module 20 and second multiplexer module 22 repeats at the third multiplexer module 24, as well as at downstream multiplexer modules in the RFID antenna assembly 10.

In a second mode of use, per an embodiment, the RFID reader 12 need not command state changes of the switches 46 in individual multiplexer modules 18 of the RFID antenna assembly 10. The RFID reader 12 can function nominally and without commanding the switches 46. Each microcontroller 44 in the multiplexer modules 18 of the RFID antenna assembly 10 can be programmed to remain in connection with its associated antenna 28 for a predetermined time period. In an example, the predetermined time period can be instructed by the RFID reader 12 at the outset of use and before reading is carried out at the RFID reader 12. In another example, the predetermined time period can be preprogrammed at each microcontroller 44 of each multiplexer module 18.

Furthermore, in the second mode of use and with continued reference to FIGS. 1 and 2, power is initiated at the RFID reader 12, and the microcontroller 44 of the first multiplexer module 20 powers and boots-up. The microcontroller 44 of the first multiplexer module 20 instructs its switch 46 to change its state to the output port in connection with the first antenna 30 (e.g., in FIGS. 4 and 5, the second switch state and the second output port 82). The switch 46 remains in connection with the first antenna 30 for a first time period $T_1$. After the first time period $T_1$ expires, the microcontroller 44 instructs the switch 46 of the first multiplexer module 20 to close and change its state to the output port in connection with the second multiplexer module 22 (e.g., in FIGS. 4 and 5, the first switch state and the first output port 80). The microcontroller 44 of the second multiplexer module 22, in turn, powers and boots-up. As before, the microcontroller 44 of the second multiplexer module 22 instructs its switch 46 to change its state to the output port in connection with the second antenna 32 (e.g., in FIGS. 4 and 5, the second switch state and the second output port 82). The switch 46 remains in connection with the second antenna 32 for a second time period $T_2$. The second time period $T_2$ and first time period $T_1$ can have the same value. Once again, after the second time period $T_2$ expires, the microcontroller 44 of the second multiplexer module 22 instructs its switch 46 to close and change its state to the output port in connection with the third multiplexer module 24. The microcontroller 44 of the third multiplexer module 24, in turn, powers and boots-up. All the while, the switch 46 of the first multiplexer module 20 has remained in the output port in connection with the second multiplexer module 22 in order to advance RF signals, and the switch 46 of the second multiplexer module 22 does the same to advance RF signals. The procedure described for the first multiplexer module 20 and second multiplexer module 22 repeats at the third multiplexer module 24, as well as at downstream multiplexer modules in the RFID antenna assembly 10.

Moreover, in an embodiment of the second mode of use, only the first multiplexer module 20 can keep track of the time periods in which downstream multiplexer modules of the series (i.e., second multiplexer module 22, third multiplexer module 24, etc.) are carrying-out interrogation with their respective antennas. The first multiplexer module 20 continues to advance RF signals until the downstream multiplexer modules conclude their interrogations. The aggregate and overall time period of interrogation of all downstream multiplexer modules in the RFID antenna assembly 10 (i.e., $T_1+T_2 \ldots +T_N$) can be preprogrammed at the microcontroller 44 of the first multiplexer module 20, or can be instructed by the RFID reader 12 at the outset of use. Lastly, after the downstream multiplexer modules conclude their interrogations and the overall time period expires, the first multiplexer module 20 is instructed by its microcontroller 44 to change its switch state back to the output port in communication with the first antenna 30. RF signals are no longer advanced to the downstream multiplexer modules, and power is hence removed from the downstream multiplexer modules.

During some modes of use of an RFID antenna system, it has been observed that ambiguities could arise when establishing association between an RFID tag that is read amid interrogation and the antenna through which the corresponding signal was received. In other words, in some cases it could be unclear which particular antenna—among several or many antennas—in the RFID antenna system received the signal from the particular RFID tag providing an interrogation response. With such uncertainty, tag localization determinations made by the associated data consumer can be hindered. An RFID tag read and the antenna through which signal reception took place, it has been found in many instances, should be unequivocally matched and mapped in order to facilitate proper tag localization determinations. In a particular example, ambiguities have been observed in a mode of use in which command of switch state changes is administered by the microcontroller rather than by the RFID reader and during changes in switch state (as described below in more detail, microcontroller command can be desirable for facilitation of plug-and-play (PnP) capabilities of the RFID antenna assembly with established RFID installations). If the microcontroller commands a change in switch state in the absence of direction from the RFID reader, the associated data consumer may be unable to discern the point in the concomitant data stream of tag reads at which the antenna was changed. Certain embodiments of the RFID antenna assembly 10 preclude the ambiguities and consequential disassociation from arising in the first place, and can hence facilitate proper tag localization determinations. Moreover, an attempted solution to preclude the ambiguities was to couple energy from a switch output port (e.g., output ports 104 in FIGS. 6 and 7) to an internal RFID chip of the particular multiplexer module. This was found to be only partially effective due to common RFID protocols that do not dictate the order in which RFID chips/tags are read. RFID tags in an area subject to interrogation by a newly-radiating antenna may respond before the internal tag coupled to the switch output port, it has been observed, thus thwarting preclusion of ambiguities in all circumstances.

Switch event encoding can be carried out for this purpose. In an embodiment, prior to or subsequent to each change of state of the switch 46, the switch 46 is prompted and instructed to change its state to the output port in connection with the encoder 48 (e.g., in FIGS. 4 and 5, the third switch state and the third output port 84). The microcontroller 44 can execute the instructions, or the instructions can come from the RFID reader 12, depending on the embodiment. For example, when the switch 46 is set in the second switch state and in connection with the antenna 28, the switch 46 changes to the third switch state and the third output port 84 before changing to the first switch state and the first output port 80. In the third switch state, connection with the encoder 48 is effected, and the encoder 48 conveys feedback in the form of its unique identifier to the data consumer that signifies a forthcoming state of the switch 46. In another example, when the switch 46 is set in the first switch state and the first output port 80, the switch 46 changes to the third switch state and the third output port 84 after changing to the second switch state and the second output port 82. The RFID reader 12 can read the encoder 48 and the unique identifier via backward communication from the multiplexer module 18 and to the RFID reader 12. The backward communication can be effected when the switch 46 is in the third switch state, and can be effected at other times amid use. One form of backward communication is RF backscattering in which RF signals are returned back to the RFID reader 12 via transmission line connections in response to received RF signals from the RFID reader 12. The switch 46 can remain in connection with the encoder 48 for a third time period $T_3$. In an example, the third time period $T_3$ can be a period of time suitable for the RFID reader 12 to read the encoder 48 and the unique identifier at least a single time.

After the third time period $T_3$ expires, the switch 46 is then instructed to change its state to the first output port 80 in downstream connection of the multiplexer module 18, such as in connection with other multiplexer modules in the chain, per that embodiment. Resultant RF signals are then advanced downstream. The unique identifier, when read, informs the data consumer that the switch 46 is preparing to move its position to the succeeding output port, in this case to the first output port 80. In the ensuing tag localization determination and parsing of data files of tag reads, the data consumer can track and trace changes of states of the switches 46 in the RFID antenna assembly 10—and therefore the accompanying output port changes—according to the time periods in which unique identifiers of encoders 48 were read by the RFID reader 12. In this way, the RFID antenna assembly 10 is able to resolve unwanted tag/antenna ambiguities that could otherwise arise amid use. Per an embodiment, a mapping of unique identifiers of encoders 48 and the accompanying antenna locations in the RFID antenna assembly 10 are provided to the data consumer in advance of operation.

In an embodiment of switch event encoding, and with reference to FIGS. 5 and 7, upon each change of state of the switch 46, the encoder 48 is prompted and instructed to progress and advance through a set of predetermined values for updating the stored value. Each predetermined value indicates a particular state of the switch 46, such as a previous state of the switch 46 (e.g., second switch state) or a forthcoming state of the switch 46 (e.g., first switch state). The microcontroller 44 can execute the instructions to the encoder 48 via the I²C interface 110 per an embodiment. For example, when the switch 46 is set in the second switch state and in connection with the antenna 28, the switch 46 changes to the third switch state and the third output port 84 before changing to the first switch state and the first output port 80. In the third switch state, the encoder 48 conveys feedback in the form of the set of predetermined values, as modified by instructions from the microcontroller 44. In the ensuing tag localization determination and parsing of data files of tag reads, the data consumer can track and trace changes of states of the switches 46 in the RFID antenna assembly 10—and therefore the accompanying output port changes—according to the set of predetermined values read by the RFID reader 12. In this way, the RFID antenna assembly 10 is able to resolve unwanted tag/antenna ambiguities that could otherwise arise amid use. In further embodiments of switch event encoding, the stored value in the encoder 48/third RFID chip 88 does not change amid changes of states of the switches 46; here, the interface represented at 110 could be altogether absent. Yet further, in certain embodiments the RFID reader 12 can serve to modify the set of predetermined values in the encoder 48/third RFID chip 88 by writing to the encoder 48/third RFID chip 88, whether the interface represented at 110 is present or is absent.

Figures 8A, 8B:
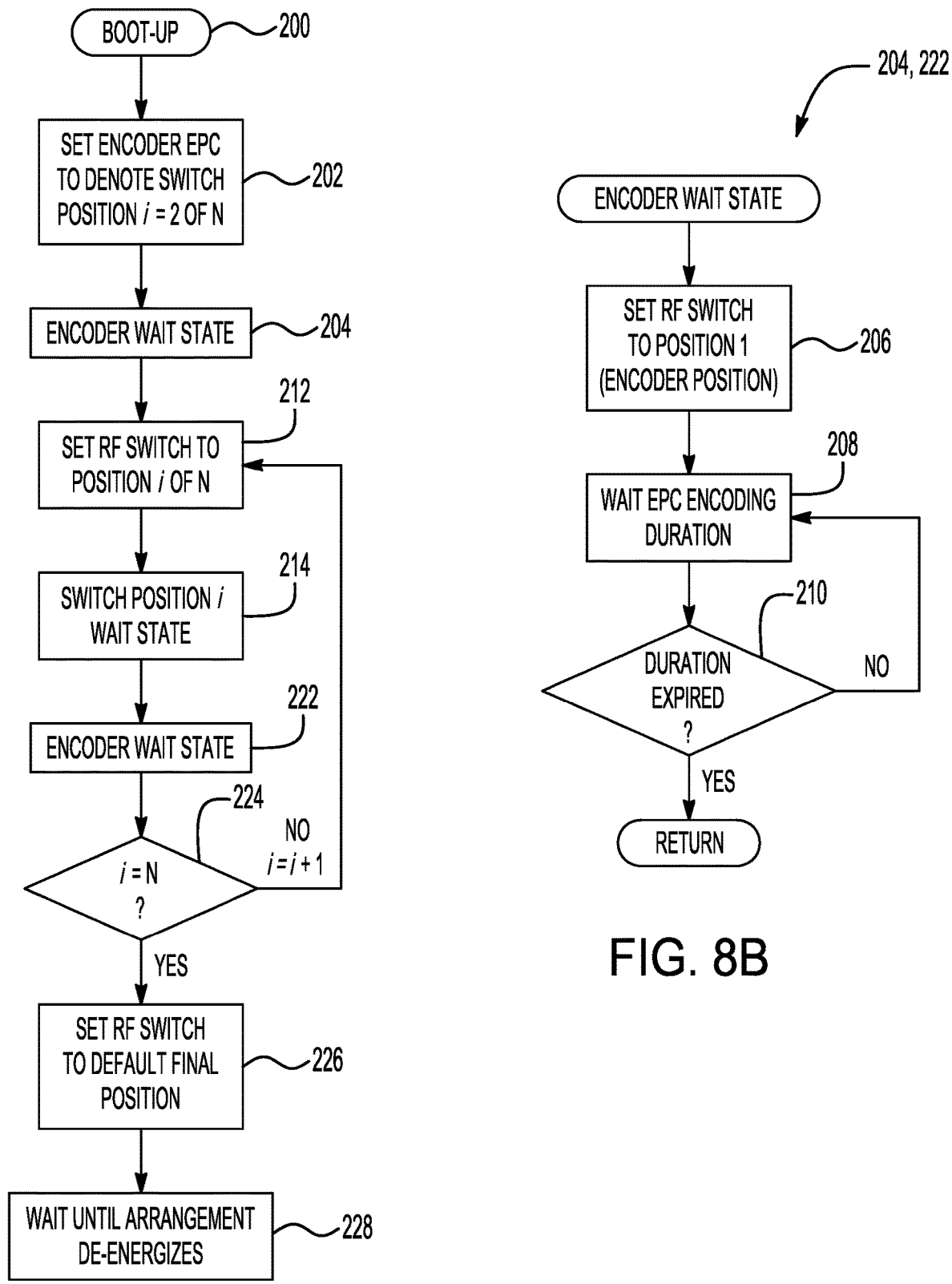
FIG. 8A is a flowchart of an embodiment of switch event encoding of the RFID antenna multiplexer module.
FIG. 8B is a flowchart of an embodiment of an encoder wait state.
Figure 8C:
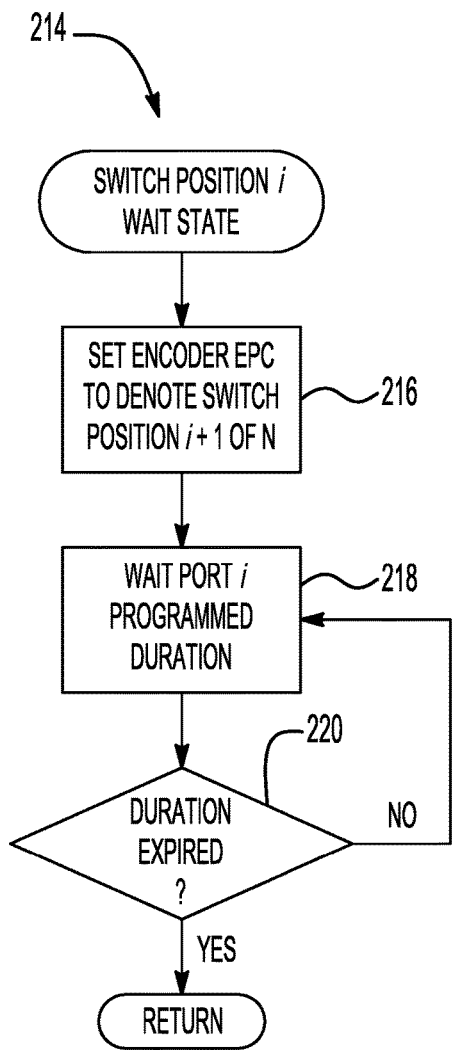
FIG. 8C is a flowchart of an embodiment of a switch position wait state.

Furthermore, an embodiment of switch event encoding is presented in the flowcharts of FIGS. 8A-8D. These flowcharts depict a workflow process in which stored values, or unique identifiers, of the encoder 48 are cycled to serve as an indication of a forthcoming state and position of the switch 46; still, the flowcharts could have more, less, and/or different steps than those presented here in other embodiments. In FIG. 8A, at step 200 the multiplexer module 18 (e.g., first multiplexer module 20) boots-up and is activated via the receipt of RF signals from the RFID reader 12. At step 202, the encoder 48 is set to denote a state and position of the switch 46 to be i=2 of N states and positions. At step 204, an encoder wait state is initiated. FIG. 8B diagrams the encoder wait state according to this embodiment. At step 206 of the encoder wait state 204, the switch 46 is set to a position 1 in which the encoder 48 is connected with (e.g., the third switch state). Further, at step 208 a length of time and duration is commenced for encoding, and at step 210 whether the duration has run and expired is queried. If NO, a recurrence of step 208 takes place; if YES, a step 212 of FIG. 8A ensues. At step 212, the switch 46 is set to a state and position i (e.g., the second switch state) of N states and positions. At step 214, a switch position i wait state is initiated. FIG. 8C diagrams the switch position i wait state according to this embodiment. At step 216 of the switch position i wait state 214, the encoder 48 is set to denote a state and position of the switch 46 to be i+1 of N states and positions. Further, at step 218 a length of time and programmed duration is commenced to remain at position i, and at step 220 whether the duration has run and expired is queried. If NO, a recurrence of step 218 takes place; if YES, a step 222 of FIG. 8A ensues. At step 222, the encoder wait state is again initiated. Then, at step 224 whether i=N is queried, N denoting the previous state and position of the switch 46. If NO, I is set to i+1 and a recurrence of step 212 takes place; if YES, a step 226 ensues. At step 226, the switch 46 is set to a default and final state and position (e.g., the first switch state). Lastly, in FIG. 8A, at step 228 a wait is initiated until the multiplexer arrangement de-energizes based on cessation of RF power from the RFID reader 12. The arrangement can be the chain or cascading arrangements as described, or could be some other arrangement.

Figure 8D:
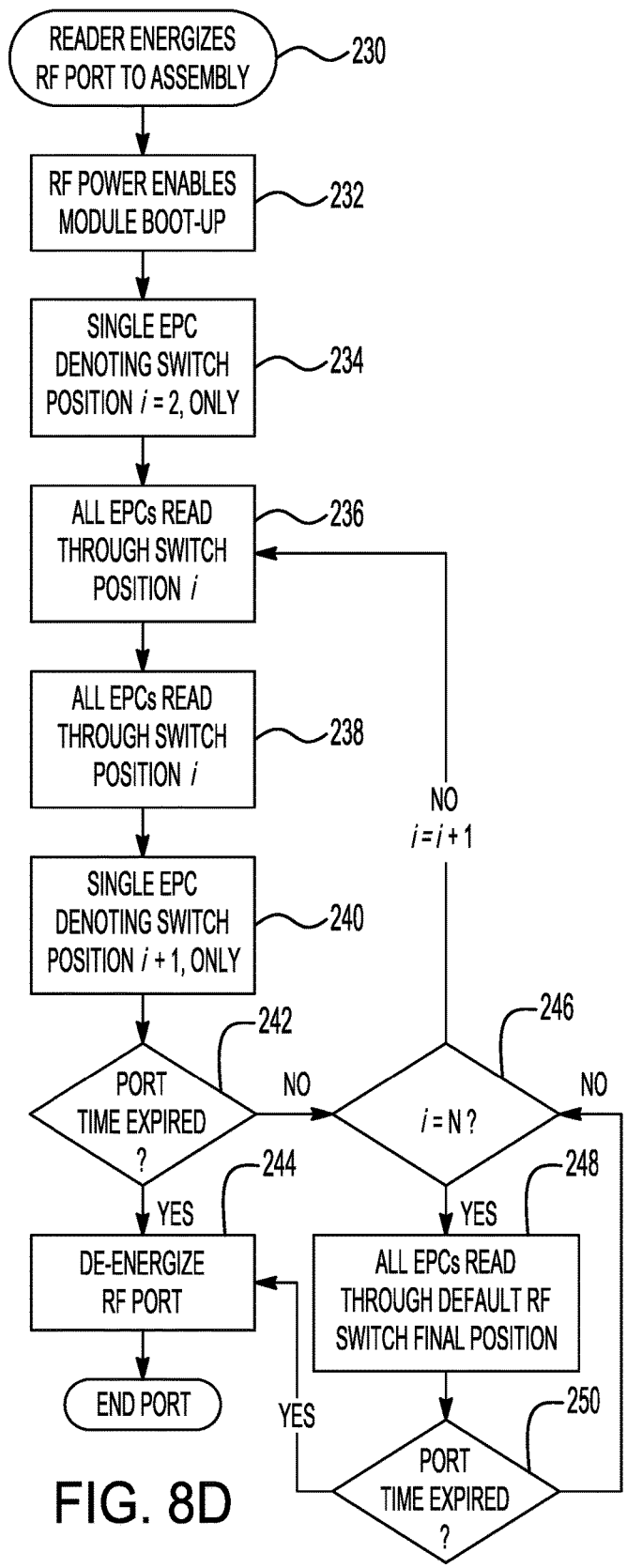
FIG. 8D is a flowchart of an embodiment of a workflow process of the RFID reader.

FIG. 8D diagrams a concurrent workflow process of the RFID reader 12 according to this embodiment. At step 230, the RFID reader 12 provides RF signaling to the RFID antenna assembly 10 via one of its ports 14 and via the cable connection 16. At step 232, the multiplexer module 18 (e.g., first multiplexer module 20) receives RF signals from the RFID reader 12 and boots-up and is activated. At step 234, the RFID reader 12 receives response communications from a single encoder 48 (e.g., of the first multiplexer module 20) and reads the state and position of the accompanying switch 46 as i=2 (corresponding to step 204 of FIG. 8A). Further, at step 236, the RFID reader 12 reads all EPC codes of RFID tags read amid interrogation and external to the antenna 28 of the instant multiplexer module 18 via the state and position i of the switch 46 (corresponding to step 212 of FIG. 8A), as well as EPC codes of RFID chips embedded in the multiplexer module 18 such as the first and second RFID chips 62, 68 and those of RFID chips embedded in preceding and upstream multiplexer modules in the RFID antenna assembly 10. At step 238, the RFID reader 12 continues to read all EPC codes of external RFID tags read amid interrogation via the state and position i of the switch 46 (corresponding to step 214 of FIG. 8A), as well as those of RFID chips embedded in the multiplexer module 18 and embedded in upstream multiplexer modules. At step 240, the RFID reader 12 receives response communications from the single encoder 48 and reads the state and position of the accompanying switch 46 as i+1 (corresponding to step 222 of FIG. 8A). At step 242, whether a length of time and duration of providing RF signaling to the RFID antenna assembly 10 has run and expired is queried. If YES, the port 14 providing RF signaling is de-energized at step 244 and the provision of RF signaling via that particular port 14 to the RFID antenna assembly 10 is ceased. If NO, a step 246 ensues. At step 246, whether i=N is queried. If NO, i is set to i+1 and a recurrence of step 236 takes place. If YES, a step 248 ensues. At step 248, the RFID reader 12 reads all EPC codes of RFID tags read amid interrogation and external to the RFID antenna assembly 10 via the default and final state and position of the switches 46 (corresponding to step 226 of FIG. 8A). Then, at step 250, whether the length of time and duration of providing RF signaling to the RFID antenna assembly 10 has run and expired is queried. If YES, the step 244 ensues; if NO, the step 246 ensues. Furthermore, the flowchart of FIG. 8D is from the perspective of the RFID reader 12 by the data consumer. Changes of states and positions of the switch 46 as communicated by values of the encoder 48 are demonstrated by the flowchart. FIG. 8D does not indicate command of the RFID reader 12 per this embodiment; rather, involvement by the RFID reader 12 is confined to time and duration lapse of providing RF signaling to the RFID antenna assembly 10 via the port 14.

Figures 9A, 9B:
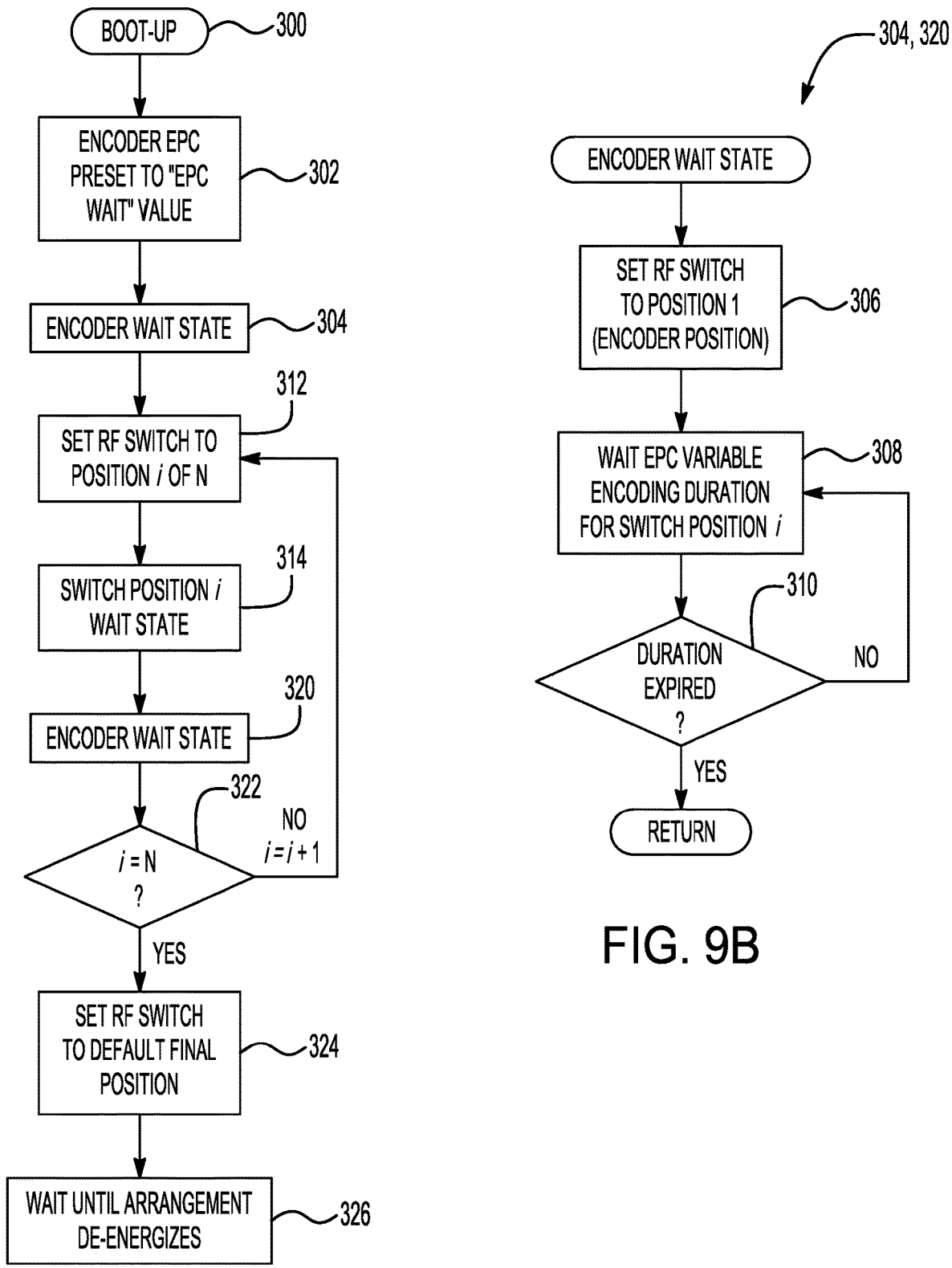
FIG. 9A is a flowchart of an embodiment of switch event encoding of the RFID antenna multiplexer module.
FIG. 9B is a flowchart of an embodiment of an encoder wait state.

Another embodiment of switch event encoding is presented in the flowcharts of FIGS. 9A-9D. These flowcharts depict a workflow process in which a fixed value, or unique identifier, of the encoder 48 informs the RFID reader 12 of that particular state and position of the accompanying switch 46, and the duration in which the switch 46 remains in that encoder state and position serves as an indication of a forthcoming state and position of the switch 46; still, the flowcharts could have more, less, and/or different steps than those presented here in other embodiments. FIGS. 9A-9D present a time-based switch event encoding scheme. In FIG. 9A, at step 300 the multiplexer module 18 (e.g., first multiplexer module 20) boots-up and is activated via the receipt of RF signals from the RFID reader 12. At step 302, the encoder 48 is preset to denote an encoder wait ("EPC Wait") value. At step 304, an encoder wait state is initiated. FIG. 9B diagrams the encoder wait state according to this embodiment. At step 306 of the encoder wait state 304, the switch 46 is set to a position 1 in which the encoder 48 is communicating with the RFID reader 12. Further, at step 308 a variable length of time and duration is commenced for encoding and for a state and position i of the switch 46. At step 310, whether the duration has run and expired is queried. If NO, a recurrence of step 308 takes place; if YES, a step 312 of FIG. 9A ensues. At step 312, the switch 46 is set to the state and position i (e.g., the second switch state) of N states and positions. At step 314, a switch position i wait state is initiated. FIG. 9C diagrams the switch position i wait state according to this embodiment. At step 316 of the switch position i wait state 314, a length of time and programmed duration is commenced to remain at position i, and at step 318 whether the duration has run and expired is queried. If NO, a recurrence of step 316 takes place; if YES, a step 320 of FIG. 9A ensues. At step 320, the encoder wait state is again initiated. Then, at step 322 whether i=N is queried, where N represents the final state and position of the switch 46 for the particular multiplexer module 18. If NO, i is set to i+1 and a recurrence of step 312 takes place; if YES, a step 324 ensues. At step 324, the switch 46 is set to a default and final state and position (e.g., the second switch state). Lastly, in FIG. 9A, at step 326 a wait is initiated until the multiplexer arrangement de-energizes. The arrangement can be the chain or cascading arrangements as described, or could be some other arrangement. The data consumer per this embodiment observes the duration in which the switch 46 remains in the encoder state and position and during which the fixed value of the encoder 48 is read amid the encoder wait state in order to determine the forthcoming state and position of the switch 46.

FIG. 9D diagrams a concurrent workflow process of the RFID reader 12 according to this embodiment. At step 328, the RFID reader 12 provides RF signaling to the RFID antenna assembly 10 via one of its ports 14 and via the cable connection 16. At step 330, the multiplexer module 18 (e.g., first multiplexer module 20) receives RF signals from the RFID reader 12 and boots-up and is activated. At step 332, the RFID reader 12 receives response communications from a single encoder 48 (e.g., of the first multiplexer module 20) and reads the variable duration which denotes the state and position of the accompanying switch 46 as i=2 (corresponding to step 304 of FIG. 9A). Further, at step 334, the RFID reader 12 reads all EPC codes of RFID tags read amid interrogation and external to the antenna 28 of the instant multiplexer module 18 via the state and position i of the switch 46 (corresponding to steps 312 and 314 of FIG. 9A), as well as EPC codes of RFID chips embedded in the multiplexer module 18 such as the first and second RFID chips 62, 68 and those of RFID chips embedded in preceding and upstream multiplexer modules in the RFID antenna assembly 10. At step 336, the RFID reader 12 continues to read all EPC codes of external RFID tags read amid interrogation via the state and position i of the switch 46 (corresponding to step 314 of FIG. 9A), as well as those of RFID chips embedded in the multiplexer module 18 and embedded in upstream multiplexer modules. At step 338, the RFID reader 12 receives response communications from the single encoder 48 and reads the variable duration which denotes the state and position of the accompanying switch 46 as i+1 (corresponding to step 320 of FIG. 9A). At step 340, whether a length of time and duration of providing RF signaling to the RFID antenna assembly 10 has run and expired is queried. If YES, the port 14 providing RF signaling is de-energized at step 342 and the provision of RF signaling is ceased. If NO, a step 344 ensues. At step 344, whether i=N is queried. If NO, i is set to i+1 and a recurrence of step 334 takes place. If YES, a step 346 ensues. At step 346, the RFID reader 12 reads all EPC codes of RFID tags read amid interrogation and external to the antenna 28 of the instant multiplexer module 18 via the default and final state and position of the switch 46 (corresponding to step 324 of FIG. 9A), as well as EPC codes of RFID chips embedded in the multiplexer module 18 such as the first and second RFID chips 62, 68 and those of RFID chips embedded in preceding and upstream multiplexer modules in the RFID antenna assembly 10. In embodiments in which the default and final state and position of the switch 46 is the third switch state and the encoder 48 is hence subject to being read, then the RFID reader 12 at step 346 continues to read that encoder 48 as well as EPC codes of RFID chips embedded in the multiplexer module 18 such as the first and second RFID chips 62, 68 and those of RFID chips embedded in preceding and upstream multiplexer modules in the RFID antenna assembly 10. Then, at step 348, whether the length of time and duration of providing RF signaling to the RFID antenna assembly 10 has run and expired is queried. If YES, the step 342 ensues; if NO, the step 344 ensues.

Figures 10A, 10B:
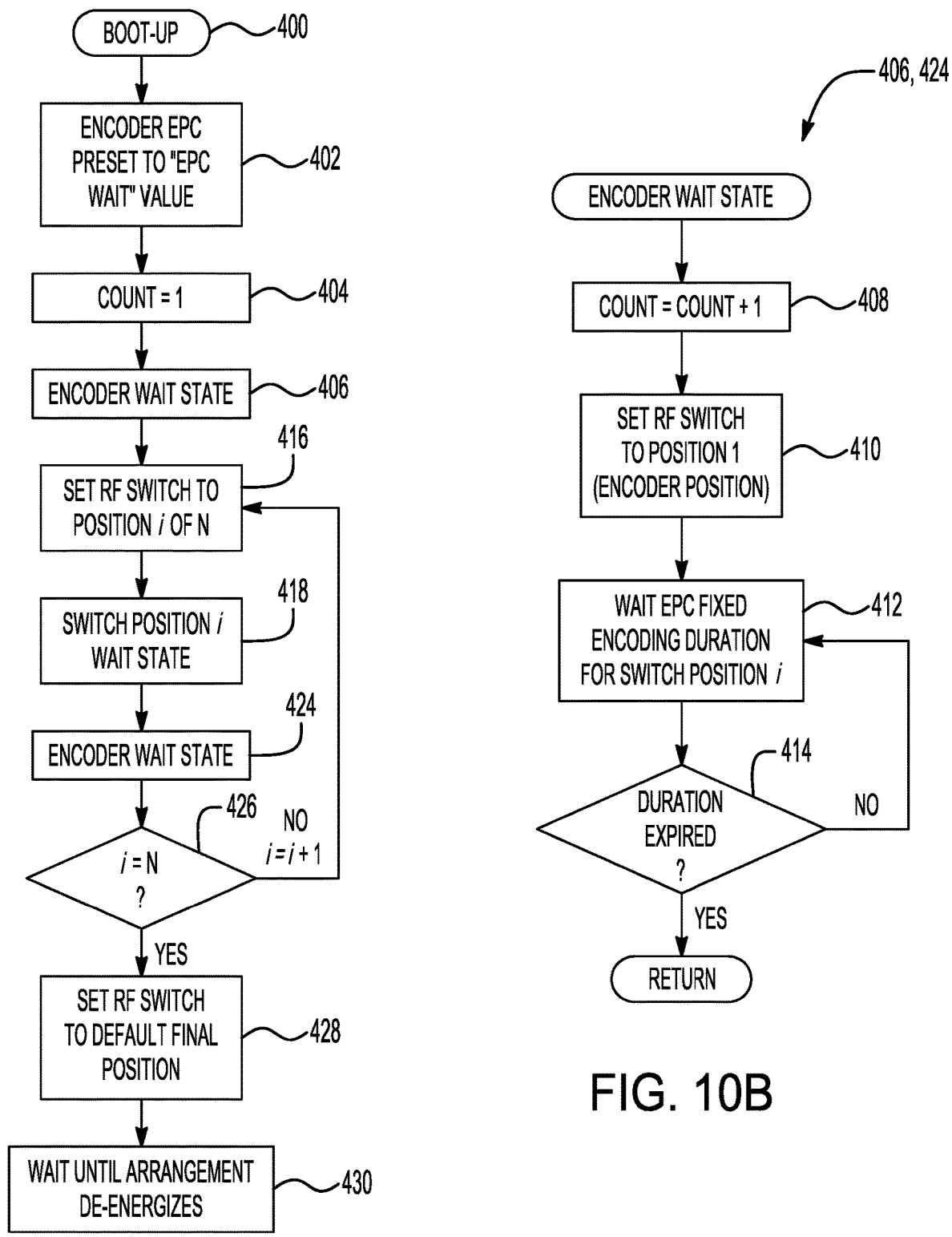
FIG. 10A is a flowchart of an embodiment of switch event encoding of the RFID antenna multiplexer module.
FIG. 10B is a flowchart of an embodiment of an encoder wait state.
Figures 10C, 10D:
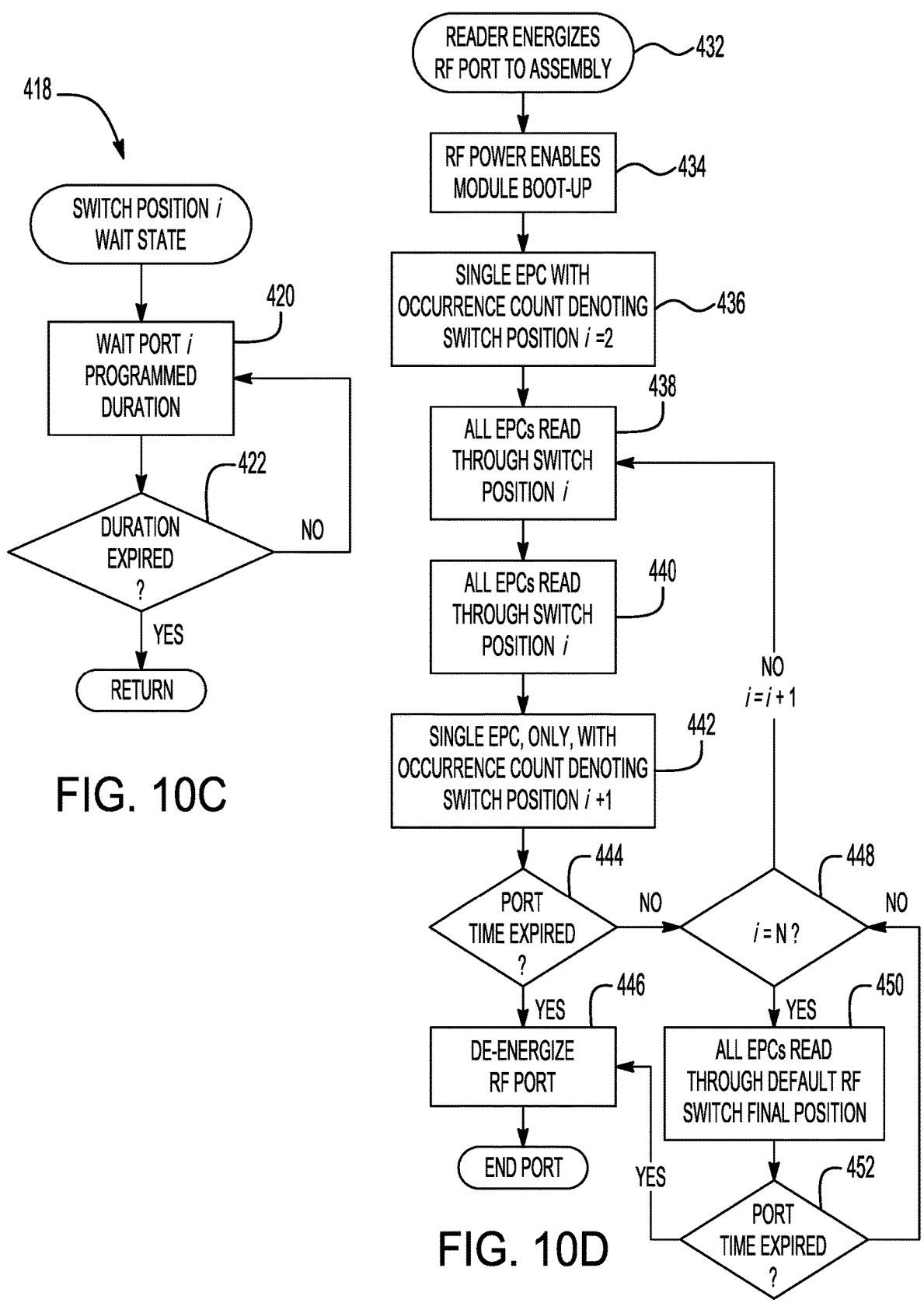
FIG. 10C is a flowchart of an embodiment of a switch position wait state.
FIG. 10D is a flowchart of an embodiment of a workflow process of the RFID reader.

Yet another embodiment of switch event encoding is presented in the flowcharts of FIGS. 10A-10D. These flowcharts depict a workflow process in which a fixed value, or unique identifier, of the encoder 48 informs the RFID reader 12 of that particular state and position of the accompanying switch 46, and the number of occurrences in which the switch 46 exhibits that encoder state and position—and hence the fixed value is read—serves as an indication of a forthcoming state and position of the switch 46; still, the flowcharts could have more, less, and/or different steps than those presented here in other embodiments. FIGS. 10A-10D present a count-based switch event encoding scheme. In FIG. 10A, at step 400 the multiplexer module 18 (e.g., first multiplexer module 20) boots-up and is activated via the receipt of RF signals from the RFID reader 12. At step 402, the encoder 48 is preset to denote an encoder wait ("EPC Wait") value. At step 404, a count is set to equal 1. At step 406, an encoder wait state is initiated. FIG. 10B diagrams the encoder wait state according to this embodiment. At step 408 of the encoder wait state 406, the count is set to equal plus 1 (+1) from its previous value. Further, at step 410 the switch 46 is set to a position 1 in which the encoder 48 is connected with (e.g., the third switch state). At step 412, a fixed length of time and duration is commenced for encoding and for a state and position i of the switch 46. At step 414, whether the duration has run and expired is queried. If NO, a recurrence of step 412 takes place; if YES, a step 416 of FIG. 10A ensues. At step 416, the switch 46 is set to the state and position i (e.g., the second switch state) of N states and positions. At step 418, a switch position i wait state is initiated. FIG. 10C diagrams the switch position i wait state according to this embodiment. At step 420 of the switch position i wait state 418, a length of time and programmed duration is commenced to remain at position i, and at step 422 whether the duration has run and expired is queried. If NO, a recurrence of step 420 takes place; if YES, a step 424 of FIG. 10A ensues. At step 424, the encoder wait state is again initiated. Then, at step 426 whether i=N is queried. If NO, i is set to i+1 and a recurrence of step 416 takes place; if YES, a step 428 ensues. At step 428, the switch 46 is set to a default and final state and position (e.g., the second switch state). Lastly, in FIG. 10A, at step 430 a wait is initiated until the multiplexer arrangement de-energizes. The arrangement can be the chain or cascading arrangements as described, or could be some other arrangement.

FIG. 10D diagrams a concurrent workflow process of the RFID reader 12 according to this embodiment. At step 432, the RFID reader 12 provides RF signaling to the RFID antenna assembly 10 via one of its ports 14 and via the cable connection 16. At step 434, the multiplexer module 18 (e.g., first multiplexer module 20) receives RF signals from the RFID reader 12 and boots-up and is activated. At step 436, the RFID reader 12 receives response communications from a single encoder 48 (e.g., of the first multiplexer module 20) and reads the occurrence count which denotes the state and position of the accompanying switch 46 as i=2 (corresponding to step 406 of FIG. 10A). Further, at step 438, the RFID reader 12 reads all EPC codes of RFID tags read amid interrogation and external to the antenna 28 of the instant multiplexer module 18 via the state and position i of the switch 46 (corresponding to step 416 of FIG. 10A), as well as EPC codes of RFID chips embedded in the multiplexer module 18 such as the first and second RFID chips 62, 68 and those of RFID chips embedded in preceding and upstream multiplexer modules in the RFID antenna assembly 10. At step 440, the RFID reader 12 continues to read all EPC codes of external RFID tags read amid interrogation via the state and position i of the switch 46 (corresponding to step 418 of FIG. 10A), as well as those of RFID chips embedded in the multiplexer module 18 and embedded in upstream multiplexer modules. At step 442, the RFID reader 12 receives response communications from the single encoder 48. The data consumer uses the occurrence count to denote the state and position of the accompanying switch 46 as i+1 (corresponding to step 424 of FIG. 10A). At step 444, whether a length of time and duration of providing RF signaling to the RFID antenna assembly 10 has run and expired is queried. If YES, the port 14 providing RF signaling is de-energized at step 446 and the provision of RF signaling is ceased. If NO, a step 448 ensues. At step 448, whether i=N is queried. If NO, i is set to i+1 and a recurrence of step 438 takes place. If YES, a step 450 ensues. At step 450, the RFID reader 12 reads all EPC codes of RFID tags read amid interrogation and external to the antenna 28 of the instant multiplexer module 18 via the default and final state and position of the switch 46 (corresponding to step 428 of FIG. 10A), as well as EPC codes of RFID chips embedded in the multiplexer module 18 such as the first and second RFID chips 62, 68 and those of RFID chips embedded in preceding and upstream multiplexer modules in the RFID antenna assembly 10. In embodiments in which the default and final state and position of the switch 46 is the third switch state and the encoder 48 is hence subject to being read, then the RFID reader 12 at step 450 continues to read that encoder 48 as well as EPC codes of RFID chips embedded in the multiplexer module 18 such as the first and second RFID chips 62, 68 and those of RFID chips embedded in preceding and upstream multiplexer modules in the RFID antenna assembly 10. Then, at step 452, whether the length of time and duration of providing RF signaling to the RFID antenna assembly 10 has run and expired is queried. If YES, the step 446 ensues; if NO, the step 448 ensues.

These embodiments of switch event encoding can be carried out in different modes of use of the RFID antenna assembly 10, and when command and control of the RFID antenna assembly 10 is administered wholly by the RFID reader 12, wholly by the microcontroller 44, or is shared partly by the RFID reader 12 and partly by the microcontroller 44. In an embodiment, upon boot-up and activation of the RFID reader 12, the initial state and position of the switch 46 can be set to the first output port 80 (e.g., downstream module/node) or the second output port 82 (e.g., antenna 28), rather than to the third output port 84 (e.g., encoder 48). The sequence of changes of switch states and positions is presumed to be known to the data consumer, per this embodiment, a priori based on programming of the microcontroller 44.

Further, ambiguities between RFID tag reads and the antennas through which the corresponding signal was received have been observed at other times. Before or at initial activation of the multiplexer module 18, for instance, the switch 46 could exhibit a floating condition in which neither DC power nor control signals are being transmitted to, and received by, the switch 46. Initial activation is at the outset of use of the RFID antenna assembly 10 and boot-up of the multiplexer module 18, and at the onset of RF signals and power to the multiplexer module 18 and to the switch 46. The switch 46 could have been in an off state, per an example. In the floating condition, the switch 46 may not have discernible connection with any of its output ports. A particular switch state may not be established. Switch leakage can occur, and ambiguities could consequently arise at the time of initial activation when establishing association between an RFID tag that is read and the antenna through which signal reception occurred. Certain embodiments of the RFID antenna assembly 10 preclude these ambiguities, and can hence facilitate proper tag localization determinations.

Fast switch stabilization can be carried out for this purpose. In an embodiment, the state of the switch 46 is rapidly set after initial RF power from the RFID reader 12 and initial activation of the multiplexer module 18 but before the RFID reader 12 initiates and issues a query command. The switch 46 can be set to a default state and position. The default state can be any one of the switch's states for connection with any one of the switch's output ports. In the embodiments of FIGS. 4 and 5, for instance, the default state can be the first switch state and the first output port 80, the second switch state and the second output port 82, or the third switch state and the third output port 84. As previously described, the multiplexer module 18 can have the first rectifier 40 and the second rectifier 42. Each rectifier can establish an RF power rectification stage. The first rectifier 40 can establish a first, or faster, rectification stage, and the second rectifier 42 can establish a second, or slower, rectification stage. The first rectification stage has a shorter charging time constant compared to the second rectification stage. The first rectifier 40 can exhibit a lower load resistance and/or a lower capacitance than the second rectifier 42. At initial activation of the multiplexer module 18, per this embodiment, the first rectifier 40 immediately transmits DC power to the switch driver 86. The switch driver 86, in turn, rapidly sets the switch 46 to the default state. The transmission of DC power via the first rectifier 40 can be more immediate than the transmission of DC power via the second rectifier 42. In this way, an RFID tag interrogation response that happens at initial activation of the multiplexer module 18 can be associated with the switch's default state, thereby resolving ambiguities that might otherwise exist.

According to an embodiment, after initial activation of the multiplexer module 18 and the immediate transmission of DC power via the first rectifier 40, DC power from the second rectifier 42 may then be employed to provide power to the microcontroller 44. The microcontroller 44 can henceforth transmit control signals to the switch driver 86 for command and control of the switch 46, such as command of its change of states and positions. In certain embodiments, the lower capacitance of the first rectifier 40 may not always fully satisfy DC power loads demanded of the multiplexer module 18 and, in particular, demanded of the microcontroller 44. For instance, during RFID tag interrogation, the RFID reader 12 may momentarily cease or otherwise limit RF signal transmission, such as via signal modulation. A brownout condition or even a blackout condition, it is thought, could be a consequence in the multiplexer module 18 and in the RFID antenna assembly 10 if only a lower capacitance rectifier is in use. The increased capacitance of the second rectifier 42 can more readily handle and more fully satisfy DC power loads under such circumstances. DC power of the second rectifier 42 may be more persistent and more robust, in this regard, than that of the first rectifier 40. Once sufficiently charged, per an embodiment, DC power from the second rectifier 42 can provide power to the microcontroller 44, and the microcontroller 44 can thereafter control the change of states of the switch 46, among other functions potentially performed.

Furthermore, at least some embodiments of the RFID antenna assembly 10 facilitate and furnish plug-and-play (PnP) capabilities with established RFID installations. The RFID antenna assembly 10 can be retrofitted in RFID systems already in-place in a particular application. The RFID antenna assembly 10 can be installed as a direct drop-in replacement antenna assembly, for instance, with the same hardware, software, and middleware components of the established RFID system remaining in-place, and without departing from normal operating modes of the RFID system such that only the data consumer calls-for knowledge of the sequence of changes of switch states and positions, as well as knowledge of an encoding scheme as programmed in the microcontroller 44, per an embodiment. The associated RFID reader can operate without having to command switch state changes, or possess awareness of switch state changes. It has been found, in many cases, to be more efficient to have the microcontroller 44 command state changes of the switch 46 rather than the RFID reader 12. Past RFID systems, in contrast, have called-for added and/or modified software at the RFID reader with antenna additions—or custom control and command by the RFID reader—which has discouraged deployment of previous antenna assemblies as a consequence. The RFID antenna assembly 10, per some embodiments, sidesteps some or all of these shortcomings.

The RF power harvesting and self-powering capabilities of certain embodiments of the multiplexer module 18 via the first rectifier 40 and/or via the second rectifier 42 can contribute to the plug-and-play adaptation of the RFID antenna assembly 10. Further, the self-control capabilities of certain embodiments via the microcontroller 44 can contribute to the plug-and-play adaptation, as well as the preclusion of tag/antenna ambiguities and resolution of disassociation in certain embodiments of the RFID antenna assembly 10. The RFID antenna assembly 10, however, need not exhibit all of these attributes to facilitate PnP, and instead can exhibit only one of them or a combination of them. Indeed, the plug-and-play capabilities can be altogether absent in some embodiments of the RFID antenna assembly 10.

Still, the RFID antenna assembly 10 could have other designs, constructions, and components in other embodiments. In one embodiment, for example, the microcontroller is absent and replaced with a timer and state machine. The timer and state machine could commence at initial activation of the multiplexer module, and could be employed in the changing of states of the switch. In another embodiment of the RFID antenna assembly 10, one or more of the output ports of the switch could electrically couple to one or more discrete chains or other arrangements of multiplexer modules, or could electrically couple to one or more discrete antennas. In yet another embodiment, the entirety of RF signals advancing downstream of the multiplexer module are harvested and rectified and directed to a local sensor node. Power is thereby provided at the local sensor node. The local sensor node could be in the form of a Wi-Fi node, a Bluetooth node, and/or another type of node, per further embodiments.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A radio-frequency identification (RFID) antenna assembly, comprising:
   a plurality of multiplexer modules coupled with one another, at least one multiplexer module of the plurality of multiplexer modules comprising: a switch and an encoder, the switch receiving radio frequency (RF) signals from an RFID reader via an input port and having a plurality of output ports, a state of the switch changeable to each of the plurality of output ports, a first output port of the plurality of output ports connectable with an antenna, and a second output port of the plurality of output ports connectable with the encoder; wherein the at least one multiplexer module further comprises a first rectifier and a second rectifier, the first rectifier and the second rectifier receiving at least a portion of the RF signals from the RFID reader, and wherein, after initial activation of the at least one multiplexer module and prior to initiation of a query from the RFID reader, power provided from the first rectifier is used to set the switch to a default state; and
   wherein the at least one multiplexer module further comprises a first RFID chip and a second RFID chip, the first RFID chip and the first rectifier incorporated together for receiving the at least portion of RF signals from the RFID reader, the second RFID chip and the second rectifier incorporated together for receiving the at least portion of RF signals from the RFID reader.

2. The radio-frequency identification (RFID) antenna assembly of claim 1, wherein, prior or subsequent to a change of state of the switch among the plurality of output ports excepting the second output port, the switch is prompted to change its state to the second output port and connect with the encoder.

3. The radio-frequency identification (RFID) antenna assembly of claim 2, wherein the encoder conveys at least one identifier to the RFID reader when the switch connects with the encoder.

4. The radio-frequency identification (RFID) antenna assembly of claim 1, wherein the at least one multiplexer module comprises an RFID chip, the RFID chip and the encoder incorporated together, and the second output port connectable with the RFID chip.

5. The radio-frequency identification (RFID) antenna assembly of claim 1, wherein the at least one multiplexer module comprises a microcontroller, the microcontroller commanding a change of state of the switch among the plurality of output ports.

6. The radio-frequency identification (RFID) antenna assembly of claim 1, wherein the at least one multiplexer module comprises a microcontroller, and wherein, prior or subsequent to each change of state of the switch among the plurality of output ports excepting the second output port, the microcontroller prompts the encoder to advance through a stored value, the stored value indicative of a previous state of the switch or a forthcoming state of the switch.

7. The radio-frequency identification (RFID) antenna assembly of claim 1, wherein the at least one multiplexer module comprises a microcontroller, and wherein, after initial activation of the at least one multiplexer module, power provided from the second rectifier is received by the microcontroller and the microcontroller commands a change of state of the switch among the plurality of output ports.

8. The radio-frequency identification (RFID) antenna assembly of claim 1, wherein a change of state of the switch is controlled in the absence of commands from the RFID reader, and backward communication with the RFID reader occurs when the switch connects with the encoder.

9. A radio-frequency identification (RFID) antenna multiplexer module, comprising:
   a switch receiving radio frequency (RF) signals from an RFID reader, the switch having a plurality of output ports, a first output port of the plurality of output ports connectable with an antenna;
   an encoder, a second output port of the plurality of output ports of the switch connectable with the encoder;
   a microcontroller commanding a change of state of the switch among the plurality of output ports, wherein, prior or subsequent to a change of state of the switch among the plurality of output ports excepting the second output port, the microcontroller commands the switch to change its state to the second output port to connect with the encoder;
   a first rectifier receiving at least a portion of the RF signals from the RFID reader, wherein power provided from the first rectifier is used to set the switch to a default state among the plurality of output ports after initial activation of the RFID antenna multiplexer module and prior to initiation of a query from the RFID reader; and
   a second rectifier receiving at least a portion of the RF signals from the RFID reader, wherein power provided from the second rectifier is received by the microcontroller and the microcontroller commands the change of state of the switch among the plurality of output ports subsequent to the switch being set to the default state;
   a first RFID chip, the first RFID chip and the first rectifier incorporated together;

a second RFID chip, the second RFID chip and the second rectifier incorporated together; and a third RFID chip, the third RFID chip and the encoder incorporated together.

10. The radio-frequency identification (RFID) antenna multiplexer module of claim 9, further comprising a first RFID chip and a second RFID chip, the first RFID chip and the first rectifier incorporated together, and the second RFID chip and the second rectifier incorporated together.

11. The radio-frequency identification (RFID) antenna multiplexer module of claim 9, wherein the encoder conveys an identifier to the RFID reader when the switch connects with the encoder.

12. The radio-frequency identification (RFID) antenna multiplexer module of claim 9, wherein, prior or subsequent to each change of state of the switch among the plurality of output ports excepting the second output port, the microcontroller prompts the encoder to advance through a stored value, the stored value indicative of a previous state of the switch or a forthcoming state of the switch.

* * * * *